(12) United States Patent
Baksh et al.

(10) Patent No.: US 8,496,733 B2
(45) Date of Patent: Jul. 30, 2013

(54) LARGE SCALE PRESSURE SWING ADSORPTION SYSTEMS HAVING PROCESS CYCLES OPERATING IN NORMAL AND TURNDOWN MODES

(75) Inventors: Mohamed S. A. Baksh, Wheatfield, NY (US); Marian Simo, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 232 days.

(21) Appl. No.: 13/004,719

(22) Filed: Jan. 11, 2011

(65) Prior Publication Data

US 2012/0174777 A1 Jul. 12, 2012

(51) Int. Cl.
*B01D 53/047* (2006.01)
(52) U.S. Cl.
USPC ............................................................ 95/96
(58) Field of Classification Search
USPC .............. 95/96, 117, 127, 130, 139, 140, 143
See application file for complete search history.

(56) References Cited

U.S. PATENT DOCUMENTS

| | | | |
|---|---|---|---|
| 3,430,418 A | 3/1969 | Wagner | |
| 3,564,816 A | 2/1971 | Batta | |
| 3,986,849 A | 10/1976 | Fuderer et al. | |
| 4,077,779 A | 3/1978 | Sircar et al. | |
| 4,234,322 A * | 11/1980 | De Meyer et al. | 95/19 |
| 4,259,091 A | 3/1981 | Benkmann | |
| 4,299,595 A | 11/1981 | Benkmann et al. | |
| 4,299,596 A | 11/1981 | Benkmann | |
| 4,333,744 A | 6/1982 | Fuderer | |
| 4,340,398 A | 7/1982 | Doshi et al. | |
| 4,371,380 A | 2/1983 | Benkmann | |
| 4,381,189 A | 4/1983 | Fuderer | |
| 4,402,712 A * | 9/1983 | Benkmann | 95/98 |
| 4,468,237 A | 8/1984 | Fuderer | |
| 4,475,929 A | 10/1984 | Fuderer | |
| 4,482,361 A | 11/1984 | Whysall | |
| 4,499,208 A | 2/1985 | Fuderer | |
| 4,512,780 A | 4/1985 | Fuderer | |
| 4,553,981 A | 11/1985 | Fuderer | |
| 4,640,694 A | 2/1987 | Leitgeb et al. | |
| 4,650,500 A | 3/1987 | Patel | |
| 4,693,730 A | 9/1987 | Miller et al. | |
| 4,726,816 A | 2/1988 | Fuderer | |
| 4,732,578 A | 3/1988 | Benkmann | |
| 4,761,165 A | 8/1988 | Stöcker et al. | |
| 4,834,780 A | 5/1989 | Benkmann | |
| 4,957,514 A | 9/1990 | Golden et al. | |

(Continued)

FOREIGN PATENT DOCUMENTS

| EP | 0620035 A1 | 10/1994 |
|---|---|---|
| EP | 1219337 A2 | 7/2002 |

(Continued)

OTHER PUBLICATIONS

J. A.C. Silva and A. E. Rodrigues. Analysis of ZLC Technique for Diffusivity Measurements in Bidisperse Porous Adsorbent Pellets. Gas. Sep. Purif., vol. 10, No. 4, pp. 207-224, 1996.

*Primary Examiner* — Frank Lawrence, Jr.
(74) *Attorney, Agent, or Firm* — Iurie A. Schwartz

(57) ABSTRACT

The present invention relates to large scale pressure swing adsorption systems (i.e., ranging from twelve to sixteen beds) utilizing new and advanced cycles to obtain enhanced hydrogen recovery from a hydrogen containing feed gas (i.e., synthesis gas).

19 Claims, 4 Drawing Sheets

U.S. PATENT DOCUMENTS

| | | | |
|---|---|---|---|
| 4,964,888 A | 10/1990 | Miller | |
| 5,012,037 A | 4/1991 | Doshi et al. | |
| 5,051,115 A | 9/1991 | Leitgeb et al. | |
| 5,174,796 A | 12/1992 | Davis et al. | |
| 5,203,888 A | 4/1993 | Maurer | |
| 5,258,056 A | 11/1993 | Shirley et al. | |
| 5,294,247 A | 3/1994 | Scharpf et al. | |
| 5,518,526 A | 5/1996 | Baksh et al. | |
| 5,529,607 A | 6/1996 | Tan | |
| 5,565,018 A | 10/1996 | Baksh et al. | |
| 5,726,118 A | 3/1998 | Ivey et al. | |
| 5,730,003 A | 3/1998 | Nguyen et al. | |
| 5,733,359 A | 3/1998 | Doong et al. | |
| 5,735,938 A | 4/1998 | Baksh et al. | |
| 5,753,010 A | 5/1998 | Sircar et al. | |
| 5,858,068 A | 1/1999 | Lansbarkis et al. | |
| 5,912,422 A | 6/1999 | Bomard et al. | |
| 6,007,606 A | 12/1999 | Baksh et al. | |
| 6,027,549 A | 2/2000 | Golden et al. | |
| 6,183,539 B1 | 2/2001 | Rode et al. | |
| 6,210,466 B1 | 4/2001 | Whysall et al. | |
| 6,221,492 B1 | 4/2001 | Moreau et al. | |
| 6,261,343 B1 | 7/2001 | Golden et al. | |
| 6,293,998 B1 | 9/2001 | Dolan et al. | |
| 6,302,943 B1 | 10/2001 | Johnson et al. | |
| 6,315,818 B1 | 11/2001 | Monereau | |
| 6,340,382 B1 | 1/2002 | Baksh et al. | |
| 6,379,430 B1 | 4/2002 | Monereau | |
| 6,379,431 B1 | 4/2002 | Xu et al. | |
| 6,402,813 B2 | 6/2002 | Monereau et al. | |
| 6,425,939 B1 | 7/2002 | Moreau et al. | |
| 6,454,838 B1 | 9/2002 | Xu et al. | |
| 6,475,265 B1 | 11/2002 | Baksh et al. | |
| 6,483,001 B2 | 11/2002 | Golden et al. | |
| 6,500,235 B2 | 12/2002 | Zhong et al. | |
| 6,503,299 B2 | 1/2003 | Baksh et al. | |
| 6,514,317 B2 | 2/2003 | Hirano et al. | |
| 6,527,831 B2 | 3/2003 | Baksh et al. | |
| 6,530,975 B2 | 3/2003 | Rode et al. | |
| 6,565,627 B1 | 5/2003 | Golden et al. | |
| 6,565,628 B2 | 5/2003 | Xu et al. | |
| 6,632,766 B2 | 10/2003 | Kanazirev | |
| 6,699,307 B1 | 3/2004 | Lomax, Jr. | |
| 6,733,568 B2 | 5/2004 | De-Souza et al. | |
| 6,743,745 B2 | 6/2004 | Jaussaud et al. | |
| 6,783,750 B2 | 8/2004 | Shah et al. | |
| 6,814,787 B2 | 11/2004 | Golden et al. | |
| 6,843,831 B2 | 1/2005 | Van de Kleut et al. | |
| 6,849,106 B2 | 2/2005 | Le Bec | |
| 6,866,699 B2 | 3/2005 | MacDowall et al. | |
| 6,893,483 B2 | 5/2005 | Golden et al. | |
| 6,916,358 B2 | 7/2005 | Nakamura et al. | |
| 6,918,948 B2 | 7/2005 | Jaussaud et al. | |
| 6,923,844 B2 | 8/2005 | Urakami et al. | |
| 6,955,711 B2 | 10/2005 | Kawai et al. | |
| 7,025,801 B2 | 4/2006 | Monereau | |
| 7,025,804 B2 | 4/2006 | Simmons et al. | |
| 7,037,485 B1 | 5/2006 | Drnevich et al. | |
| 7,041,271 B2 | 5/2006 | Drnevich et al. | |
| 7,137,257 B2 | 11/2006 | Drnevich et al. | |
| 7,166,151 B2 | 1/2007 | Baksh et al. | |
| 7,169,210 B2 | 1/2007 | Baksh et al. | |
| 7,179,324 B2 | 2/2007 | Baksh et al. | |
| 7,255,727 B2 | 8/2007 | Monereau et al. | |
| 7,255,840 B2 | 8/2007 | Papavassiliou et al. | |
| 7,276,107 B2 | 10/2007 | Baksh et al. | |
| 7,294,172 B2 | 11/2007 | Baksh et al. | |
| 7,300,497 B2 | 11/2007 | Urakami et al. | |
| 7,300,899 B2 | 11/2007 | Weston et al. | |
| 7,306,651 B2 | 12/2007 | Cieutat et al. | |
| 7,395,670 B1 | 7/2008 | Drnevich et al. | |
| 7,396,387 B2 | 7/2008 | Baksh et al. | |
| 7,399,341 B2 | 7/2008 | Patel et al. | |
| 7,404,846 B2 | 7/2008 | Golden et al. | |
| 7,427,368 B2 | 9/2008 | Drnevich | |
| 7,452,407 B2 | 11/2008 | Golden et al. | |
| 7,467,519 B2 | 12/2008 | Raybold et al. | |
| 7,500,999 B2 | 3/2009 | Aaron et al. | |
| 7,517,390 B2 | 4/2009 | Lang | |
| 7,537,742 B2 | 5/2009 | Baksh et al. | |
| 7,588,742 B2 | 9/2009 | Haik-Beraud et al. | |
| 7,594,955 B2 | 9/2009 | Ishihara | |
| 7,628,842 B2 | 12/2009 | Schwartz et al. | |
| 7,628,843 B2 | 12/2009 | Monereau et al. | |
| 7,632,476 B2 | 12/2009 | Shah et al. | |
| 7,648,562 B2 | 1/2010 | Monereau et al. | |
| 2001/0009125 A1* | 7/2001 | Monereau et al. | 95/117 |
| 2003/0015091 A1* | 1/2003 | Xu et al. | 95/96 |
| 2005/0098034 A1* | 5/2005 | Gittleman et al. | 95/96 |
| 2009/0223371 A1 | 9/2009 | Nakao et al. | |
| 2010/0242722 A1 | 9/2010 | Belanger et al. | |

FOREIGN PATENT DOCUMENTS

| | | |
|---|---|---|
| EP | 1486245 A1 | 12/2004 |
| EP | 1972367 A1 | 9/2008 |
| WO | WO 02096539 A1 | 12/2002 |

* cited by examiner

LARGE SCALE PRESSURE SWING ADSORPTION SYSTEMS HAVING PROCESS CYCLES OPERATING IN NORMAL AND TURNDOWN MODES

FIELD OF THE INVENTION

The present invention relates to large scale pressure swing adsorption systems (i.e., ranging from twelve to sixteen beds) utilizing new and advanced cycles to obtain enhanced hydrogen recovery from a hydrogen containing feed gas (i.e., synthesis gas). The large scale plants produce 100-190 million standard cubic feet per day of gas of hydrogen. More specifically, through the newly developed process cycles, the twelve-sixteen bed PSA systems provide enhanced separation, lower adsorbent requirement (i.e., lower bed size factor (BSF)), and lower capital and operating costs. The cycles of the present invention are designed for PSA systems having twelve to sixteen beds. However, new cycles are also provided, where the twelve bed PSA system can be operated in a turndown mode where one or more beds are taken offline, also referred herein as "turndown mode". In addition, the invention relates to a novel adsorbent layering employed in the beds of the PSA.

BACKGROUND OF THE INVENTION

The need for high purity gasses, such as hydrogen, processed from effluents in the chemical process industries remain. These effluents are hydrogen containing gas mixtures (i.e., synthesis gases), from the likes of steam methane reforming of natural gas or naptha, catalytic reforming of hydrocarbons, isomerization processes, etc., which are routed to a PSA for further processing. This growing demand requires the need to develop highly efficient separation processes (e.g., PSA) for hydrogen ($H_2$) production from various feed mixtures. In order to obtain highly efficient PSA separation processes, both the capital and operating costs of the PSA system must be reduced. Some ways of reducing PSA system cost include a decrease in the adsorbent inventory, reduction in the number of PSA beds, and using advanced cycles in the PSA processes. The aforementioned ways of reducing the PSA system cost constitute the elements of the present invention.

Conventional PSA systems are well known for separating feed mixture gases which contain components with different adsorption characteristics. For example, in a typical PSA system, a multicomponent gas is passed to at least one of multiple adsorption beds at an elevated pressure to adsorb at least one strongly sorbed component while at least one component passes through. In the case of hydrogen PSA, hydrogen is the most weakly adsorbed component which passes through the bed. At a defined time, the feed step is discontinued and the adsorption bed is co-currently depressurized in one or more steps, counter-currently purged in one or more steps and counter-currently depressurized in more or more steps to permit essentially pure hydrogen product to exit the bed with a high recovery. The sequence of steps is not limited to the aforementioned, and a combination of two or more steps can be performed as part of a single step.

In the related art, U.S. Pat. No. 6,379,431 relates to a pressure swing adsorption process including an apparatus having a plurality of beds and counter-currently purging at least two of the beds simultaneously throughout the process. This patent discloses process cycles for twelve bed PSA systems, which have three or four beds on simultaneous feed, and three or four equalization steps. Specifically, these are 12-3-3/4 and 12-4-4 cycles. In the 12-3-3/4 cycle, the 3/4 equalization steps means that the fourth equalization is not a true equalization step (i.e., equalization step where two beds are in communication). In fact, the equalization step overlaps with the provide purge step. The 12-4-4 cycle, on the other hand, features a holding step, which typically degrades the PSA performance. Also, U.S. Pat. No. 6,379,431 does not follow the sequential refluxing protocol during the purge steps in the PSA cycle, which invariably results in a degradation in hydrogen recovery.

U.S. Pat. No. 6,210,466 discloses a 16-4-4 PSA cycle which overcomes historical limitations to the capacity of PSA units for a wide variety of gas separations. Capacities in excess of about 110 thousand normal cubic meters per hour (100 million standard cubic feet per day) can now be achieved in a single integrated process train. The corresponding significant equipment reduction results from a departure from the accepted principle in the PSA arts that the length of the purge step must be equal to or less than the length of the adsorption step. This patent discloses that increasing the purge time relative to the adsorption step combined with supplying the purge gas for any adsorption bed in the train from one or more other adsorption beds and during the provide-purge step, the other adsorption beds simultaneously provide the purge gas to essentially all adsorption beds undergoing the purge step, that the single train can provide for significant increases in capacity with a minimum loss in recovery or performance. The alleged benefit is that very large-scale PSA units can now be constructed as a single train of equipment for a cost significantly lower than the cost of two or more parallel trains of equipment.

U.S. Pat. No. 6,565,628 B2 relates to a method of reducing the cycle time in a pressure swing adsorption process by reducing the required pressure equalization time. This document discloses fourteen and sixteen bed PSA systems having, inter alia, 14-3-5, 14-3-4 and 14-4-4 cycles for the fourteen bed system, and 16-4-4, 16-4-4/5 and 16-4-5 cycles for the sixteen bed system. All of these cycles have lower throughput and recovery compared to the fourteen bed PSA system cycles of the present invention with five parallel beds on simultaneous feed and five bed-to-bed equalization steps. In addition, for the sixteen bed PSA system, the cycle of the present invention has higher throughput and higher recovery compared to prior PSA cycles.

In addition to the cycles, the related art also discusses conventional adsorbent materials utilized in the beds as a means for improving product recovery in hydrogen PSA systems. For example, U.S. Pat. No. 6,814,787 is directed to a PSA apparatus and process for the production of purified hydrogen from a feed gas stream containing heavy hydrocarbons (i.e., hydrocarbons having at least six carbons). The apparatus includes at least one bed containing at least three layers. The layered adsorption zone contains a feed end with a low surface area adsorbent (20 to 400 $m^2/g$) which comprises 2 to 20% of the total bed length followed by a layer of an intermediate surface area adsorbent (425 to 800 $m^2/g$) which comprises 25 to 40% of the total bed length and a final layer of high surface area adsorbent (825 to 2000 $m^2/g$) which comprises 40 to 78% of the total bed length.

U.S. Pat. No. 6,027,549, discloses a PSA process for the removal of carbon dioxide and then using activated carbons having bulk densities in the range of 560-610 $kg/m^3$ (35-38 $lb/ft^3$) and particle sizes in the range of 1-3 mm diameter. However, only a minimal advantage in recovery (about 0.2%) is achieved when the bulk density in the range of 35 to 38 $lb/ft^3$ is used in a five bed PSA process to produce hydrogen.

U.S. Pat. No. 6,340,382, is directed to a PSA process that purifies hydrogen from a mixture that passes through an aluminum oxide ($Al_2O_3$) layer for moisture removal, then through activated carbon layer for carbon dioxide ($CO_2$), carbon monoxide (CO), and methane ($CH_4$) removal, and finally through CaX zeolite layer for nitrogen ($N_2$) removal to produce high purity $H_2$ (>99.99%). CaX is at least 90% Ca exchanged with $SiO_2/Al_2O_3=2.0$.

U.S. Pat. No. 7,537,742 B2, co-owned by the assignee of the present invention, relates to an optimum set of adsorbents for use in hydrogen PSA systems. Each adsorbent bed is divided into four regions. The first region contains adsorbent for removing water. The second region contains a mixture of strong and weak adsorbents to remove bulk impurities like $CO_2$. The third region contains a high bulk density (>38 lbm/ft$^3$) adsorbent to remove remaining $CO_2$ and most of $CH_4$ and CO present in the hydrogen containing feed mixtures. The fourth region contains adsorbent having high Henry's law constants for the final cleanup of $N_2$ and residual impurities to produce hydrogen at the desired high purity.

U.S. Pat. No. 6,402,813 B2 describes the purification of a gas mixture by adsorption of the impurities on carbon adsorbent formed by a combination of several different active carbons. In particular, a PSA process is described for purifying a gas, such as hydrogen, nitrogen, oxygen, carbon monoxide, argon, methane or gas mixtures containing these components. The gas stream to be purified is passed through layers of carbons, wherein the ordering of the carbon layers are such that at least one of the following conditions exist: (1) the density (D) is such that D1<D2, (2) the specific surface area (SSA) is such that SSA1>SSA2, 3) the mean pore size (MPS) is such that MPS1>MPS2, and (4) the pore volume is such that PV1>PV2. More specifically, this patent relates to a process in which at least two layers of activated carbons are used in which the first layer carbon has a lesser density than the second, the first carbon has more specific surface area, and also more mean pore size than the second carbon.

To overcome the disadvantages of the related art PSA systems, it is an object of the present invention to introduce new and advanced PSA cycles for twelve bed PSA in normal operation, as well as turndown mode. These cycles for the twelve bed PSA system includes a higher number of parallel feed (i.e., beds in adsorption) and/or bed-to-bed equalization steps offering at least in part improved hydrogen recovery and throughput performance. It is a further object of the invention to design the cycles to include the use of a sequential refluxing protocol so as to improve the regenerations steps, thereby resulting in superior performance. The invention provides the following features: (1) no need for additional storage tank; (2) no idle steps; (2) continuous PSA tail gas (offgas) flow; and (4) higher recovery than the related art cycles.

It is another object of the invention to modify the adsorbent system in each bed to contain at least three layers of adsorbents (e.g., alumina, activated carbon and zeolite), wherein the active carbon and zeolite components are layered based on particle size and enables additional improvement in hydrogen recovery. Therefore, an efficient PSA separation process has been found with high hydrogen recovery, lower adsorbent requirements, (i.e., lower bed size factor (BSF)), and lower capital and operating costs. Additionally, the process should operate efficiently when one or more beds are taken offline for operational reasons such as valve failure or due to reduced demand (referred herein, as "turndown" or "turndown mode").

It is yet another object of the invention, to provide alternative twelve bed PSA cycle, as well as novel operational cycles for fourteen and sixteen bed PSA systems to increase hydrogen recovery and throughput.

BACKGROUND OF THE INVENTION

The invention provides a pressure swing adsorption process for the separation of a pressurized feed gas supply containing one or more strongly adsorbable components and at least one less strongly adsorbable product gas in a multiple bed system. The feed gas is supplied to a feed end of an adsorbent bed containing solid adsorbent material(s), which preferentially adsorb the more strongly adsorbable component(s) and withdrawing the least strongly adsorbable product component from an exit end of the adsorbent bed. This is performed in PSA cycle(s) comprised of steps in which the continuous feed gas sequentially, and co-currently flows through each of the adsorber beds to produce gas product using continuous feed gas, pressurization steps, pressure equalization step(s), blowdown step(s), and purge step(s).

The product gas of the process is preferably hydrogen although the process can be extended to other separation processes such as helium purification, natural gas upgrading, $CO_2$ production from synthesis gas or other source containing $CO_2$ in the supply feed or in other PSA processes for coproduction of $H_2$ and $CO_2$. One of the novel features of the present invention is the introduction of new and advanced cycle to PSA systems having twelve to sixteen beds. The twelve be PSA cycle has four equalization steps, while four beds are in parallel feed to achieve enhanced $H_2$ recovery. This cycle can be further modified and operate the PSA system in a turndown mode with a relatively small reduction in throughput, thereby allowing the PSA system to operate with as few as five beds. In addition, the new PSA process cycles take advantage of the sequential refluxing protocol to improve the regeneration steps, and the overall performance of the PSA system.

Another novel feature of the invention is the layered adsorbent, which can be utilized in the beds. These layered configurations of carbon and/or zeolite components differ from another layer of similar adsorbent material in particle size. These layered configurations of the bed materials combined and the PSA cycles provide a synergistic effect with an overall improvement in hydrogen recovery and throughput of 1-2% over conventional PSA cycles.

In a first exemplary embodiment of the invention, pressure swing adsorption process for separating a pressurized supply feed gas is provided. The feed gas containing one or more strongly adsorbable component is separated from at least one less strongly adsorbable product gas component in a twelve bed adsorbent system to produce a continuous stream of product gas enriched in the less strongly adsorbable component and a continuous stream of offgas that is enriched in strongly adsorbable components, wherein the process cycle has twenty-four steps including four bed-to-bed equalizations steps, while four of the beds are in production.

In other exemplary embodiments of the invention, the pressure swing adsorption system is in turndown mode with only nine, eight seven, six or five beds online and in production. In these embodiments, the process cycles are described herein.

In yet an alternative exemplary embodiment of the invention, the twelve bed PSA process cycle is modified to have twenty-four steps including five bed-to-bed equalizations steps, while three of the beds are in production.

In further exemplary embodiments of the invention, the PSA system can be scaled up to include fourteen or sixteen beds in the PSA system/skid/train. Novel cycles are provided where the fourteen bed PSA cycles have twenty-eight steps, including five bed-to-bed equalizations, and five beds are in production. The sixteen bed PSA cycle has thirty-two steps, including six bed-to-bed equalization steps, while six beds are in production.

BRIEF DESCRIPTION OF THE FIGURES

The objects and advantages of the invention will be better understood from the following detailed description of the preferred embodiments thereof in connection with the accompanying figures wherein.

DETAILED DESCRIPTION OF THE INVENTION

Figure 1:
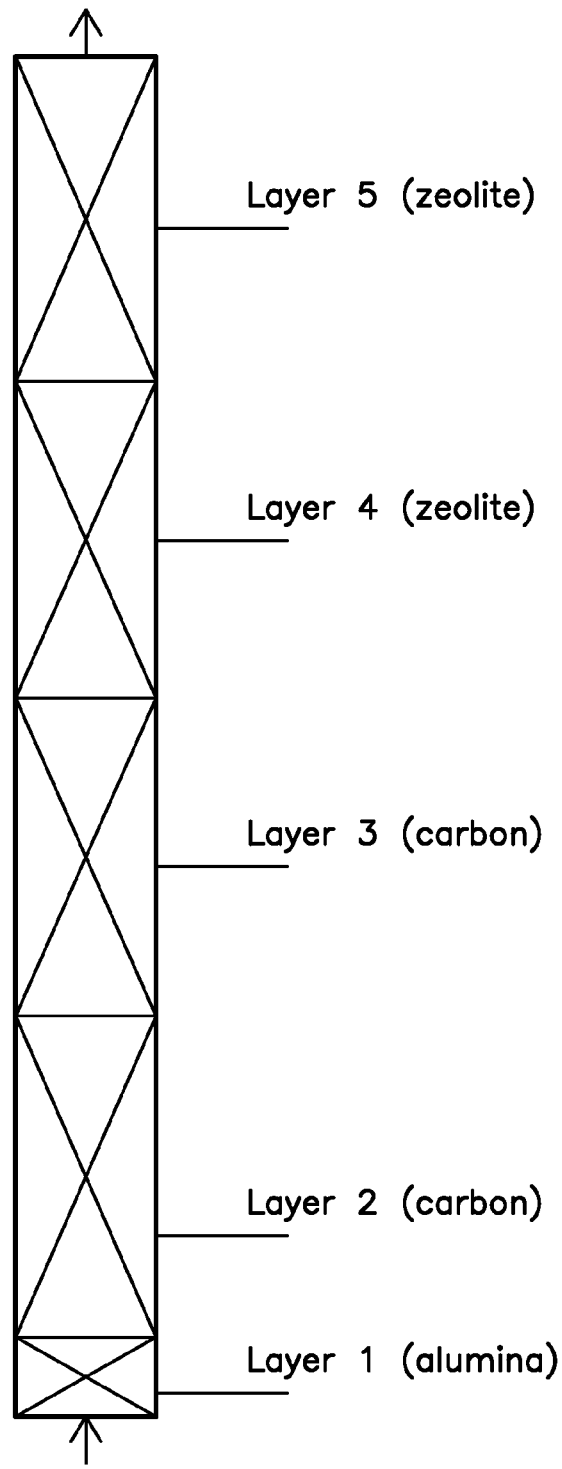
FIG. 1 illustrates an advanced bed configuration/layering in accordance with one aspect of the invention.

The invention discloses a complete set of high efficiency PSA processes/cycles employed in a twelve bed PSA system both in normal and turndown mode. When operating in normal mode (i.e., twelve beds are online), this large scale PSA system attains about 100-190 million standard cubic feet per day (MMSCFSD) of hydrogen production. Although the PSA processes/cycles described herein are with respect to the production of hydrogen, it will be understood by those skilled in the art that these cycles are applicable to any separation process of hydrogen from various feed mixtures regardless of the source.

With reference to Table 1, below, the new and advance cycles for the twelve bed PSA system are contrasted with conventional cycles for twelve bed PSA system in normal operating conditions and turndown mode. The latter naturally includes a twelve bed PSA system in turndown mode. The nomenclature utilized herein to refer to the cycles, and by way of example in a 12-4-4 cycle, the first number refers to the number of beds in the PSA system, the second number refers to the number of beds in parallel feed (i.e., at any instant processing feed) and the last number refers to the number of beds undergoing bed-to-bed equalization in a particular cycle.

TABLE 1

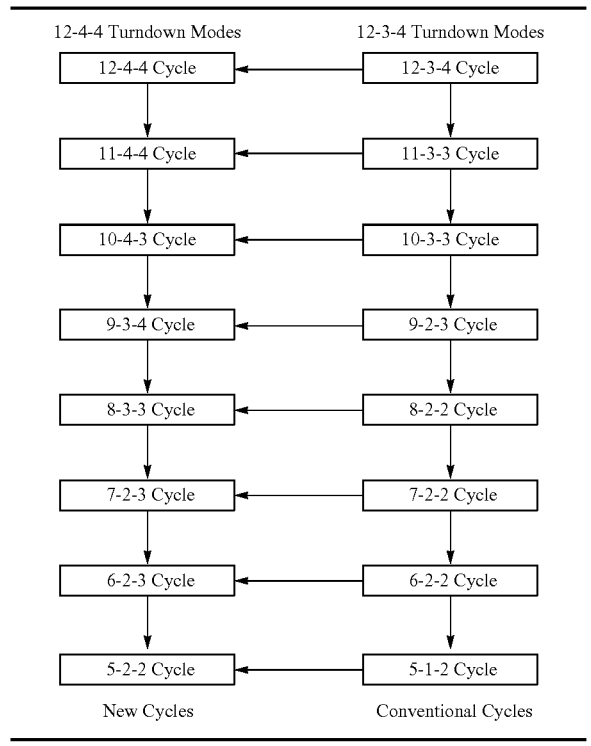

| 12-4-4 Turndown Modes | 12-3-4 Turndown Modes |
|---|---|
| 12-4-4 Cycle | 12-3-4 Cycle |
| 11-4-4 Cycle | 11-3-3 Cycle |
| 10-4-3 Cycle | 10-3-3 Cycle |
| 9-3-4 Cycle | 9-2-3 Cycle |
| 8-3-3 Cycle | 8-2-2 Cycle |
| 7-2-3 Cycle | 7-2-2 Cycle |
| 6-2-3 Cycle | 6-2-2 Cycle |
| 5-2-2 Cycle | 5-1-2 Cycle |
| New Cycles | Conventional Cycles |

As can be seen from Table 1, the conventional 12-3-4 PSA cycle defines a process sequence utilizing twelve beds, with three beds processing feed at any instant and with four bed-to-bed equalization steps. The new cycle proposed in this invention is a 12-4-4 cycle featuring four parallel feeds resulting in higher hydrogen throughput. The remaining cycles presented in Table 1 correspond to so-called turndown or exceptional modes of operation where it is necessary to operate the process with fewer beds. All of the turndown cycles of the present invention are offering improved process performance due to higher number of parallel feeds and/or bed-to-bed equalization steps. The various cycles and their mode of operation are described in detail below.

Another aspect of the invention concerns the adsorbents loaded into the beds of the hydrogen PSA to enhance the recovery of hydrogen. It has been found that the three layers of adsorbents where each layer is subdivided into two layers containing the same adsorbent, yet with different particle size, optimal adsorption and desorption kinetics for specific impurities present in the hydrogen containing feed gas is attained. This advanced adsorbent layering configuration thereby results in an improvement in hydrogen recovery.

Typical hydrogen PSA process utilizes three different adsorbents loaded in the vessel from the bottom to the top in the order such as (1) alumina; (2) activated carbon and (3) zeolite. There are five major impurities to be removed by adsorption process. Alumina adsorbs the moisture contained in the feed gas. Activated carbon layer is usually designed to take care of carbon dioxide and hydrocarbons such as methane, ethane and propane. The zeolite function is to remove carbon monoxide, nitrogen, argon and residual methane not taken out by activated carbon placed upstream of the zeolite. Additional details of the layers of adsorbents in each PSA bed are discussed in Baksh et al (U.S. Pat. No. 7,537,742 B2), which is co-owned by the assignee of the present invention, and incorporated by reference herein in its entirety.

FIG. 1 is illustrative of the adsorbents layers in each of the PSA beds of the invention. The adsorption properties in layers two, three, four and five are fine tuned by optimizing the particle size of the adsorbent used to achieve optimal PSA process performance. By way of example, layers two and three are identical (i.e., both are the same carbon material) except for the difference in particle sizes. Likewise, layers four and five are identical (i.e., both are the same zeolite material), but their particle size is different. The adsorber vessel design and configuration is such that it will be capable to adsorb five different components. Ideally, layer 1 adsorbs moisture, layer 2 adsorbs carbon dioxide, layer 3 adsorbs methane, layer 4 adsorbs carbon monoxide and layer 5 adsorbs nitrogen. Those skilled in the art will recognize that the process recovery will be maximized when adsorbents are fully utilized. Using a three layer design, the skilled artisan has only three degrees of freedom to size the adsorber for removal of five components. The inventive approach adds two more degrees of freedom thus making it possible to achieve higher hydrogen recovery in combination with the cycles of the present invention.

The adjustment of the adsorbent particle size affects the rate of adsorption and desorption process—the adsorption capacity is independent of particle size. The diffusion resistance in an adsorption process is the sum of all diffusion resistances within the particle of the adsorbent material. The change in the particle size may or may not affect the overall diffusion resistance depending on the level of contribution of the diffusion phenomena affected by the particle size.

Figure 2A:
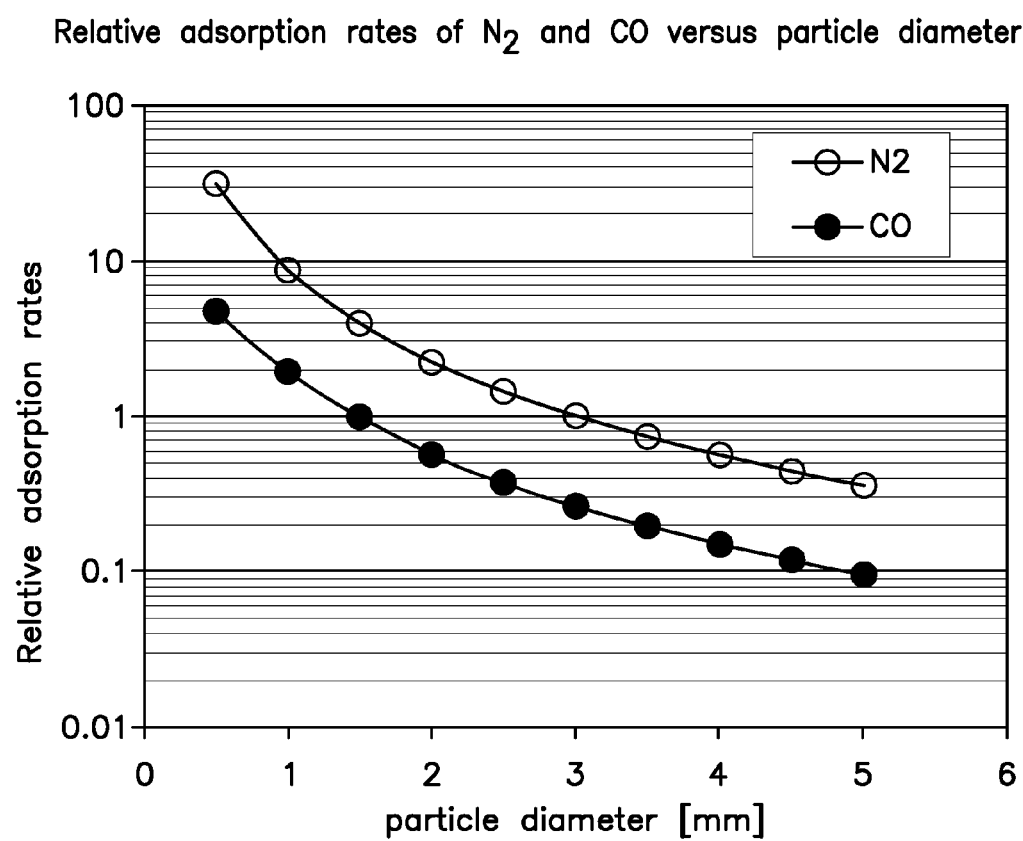
FIG. 2A is a plot of the relative adsorption rates of N2 and CO versus particle diameter for the zeolite layers shown in FIG. 1.

In one embodiment, CaX(2.3) zeolite is used in the fourth and fifth layers of FIG. 1. The layers are sized such that layer four preferably adsorbs carbon monoxide and layer five preferably adsorbs nitrogen. With reference to FIG. 2A, the dependence of relative adsorption rates on particle diameter for both nitrogen and carbon monoxide is shown. The Zero Length Column (ZLC) technique is employed to obtain the data plotted in FIG. 2A. See, J. A. C. Silva & A. E. Rodrigues, Gas. Sep. Purif., Vol. 10, No. 4, pp. 207-224, 1996.

The value of the relative adsorption rate is the ratio of true adsorption rate and the standard rate value. The standard rate value corresponds to a required minimum rate needed to yield the enhanced PSA process performance. If the same particle size (e.g., 2.5 mm) is used for both layers in the process the requirement for nitrogen rate is satisfied. However, as can be determined from FIG. 2A, the CO rate relative adsorption rate is only 40% of the required minimum. Therefore, it is desirable to decrease the zeolite particle size in layer four in order to increase the rate of carbon monoxide adsorption. A value of 1.5 mm meets the design specification for the rate of carbon monoxide in this particular exemplary embodiment. It is obvious that one could increase the nitrogen rate as well by decreasing the particle size in layer five. As a result, only negligible process improvement will be realized since the nitrogen adsorption rate was already above the required minimum value. On the other hand; the process performance can suffer from the increased pressure drop in the bed. The preferred layering for this particular example will be particle sizes larger than 2 mm and smaller than 3 mm for layer five and particle sizes larger than 0.5 mm and smaller than 2 mm for layer four.

Figure 2B:
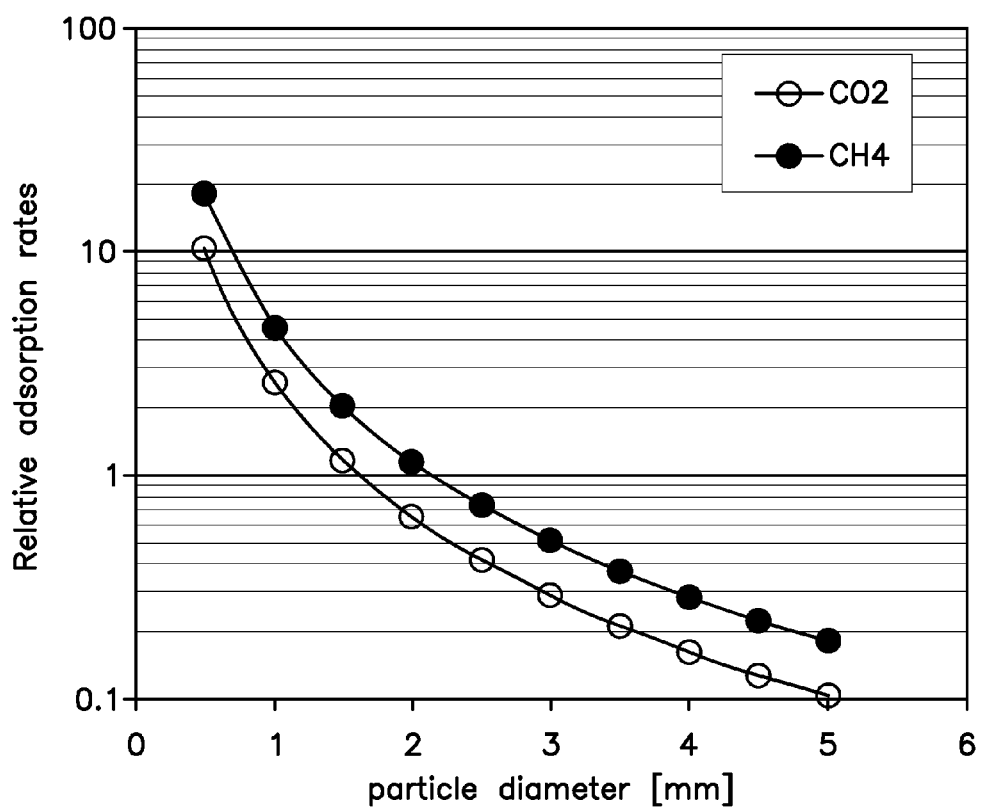
FIG. 2B is a plot of the relative adsorption rates of CO2 and CH4 versus particle diameter for the carbon layers shown in FIG. 1.

Carbon layers two and three will be occupied with the carbon particles of different size as well. The ZLC technique is employed once again to measure the adsorption rates for carbon dioxide and methane on the carbon material. The rate data normalized by the standard rate is summarized in FIG. 2B. The rate for methane is satisfactory at particle sizes less than 2.25 mm. However, the smaller particles are needed to obtain reasonable rates for carbon dioxide. By inspection of the data in FIG. 2B, the preferred carbon particle size for carbon dioxide take out is less than 1.5 mm and for methane less than 2.0 mm. Thus the layering for this particular example will be particle sizes larger than 1.0 mm and smaller than 2.0 mm for layer three and particle sizes larger than 0.5 mm and smaller than 1.5 mm for layer two.

The novel PSA cycles of the present invention will now be described with reference to various exemplary embodiments. In one embodiment of the invention, the novel PSA system employs a twenty-four step, twelve adsorbent bed PSA cycle having four equalization steps, in addition to purging, blowdown, and product pressurization steps (referred herein as "the 12-4-4 PSA cycle"). The PSA system includes a continuous supply of feed gas to at least four beds which are simultaneously in the adsorption phase. These four beds separate the pressurized supply feed gas containing one or more strongly adsorbable component and allow the less strongly adsorbable hydrogen product gas (i.e., offgas) to exit the beds.

In another embodiment of the invention, the PSA system can be utilized in turndown mode with eleven beds. The PSA cycle for the eleven beds would include twenty-two steps, where four beds are in adsorption and has four bed-to-bed equalization steps in addition to the purging and product pressurization steps (referred herein as "the 11-4-4 PSA cycle").

In a further embodiment of the invention, the PSA system has ten beds and employs twenty steps in the cycle where four of the beds are simultaneously in the adsorption phase, and each bed has at least three equalization steps with another bed in addition to purging and product pressurization steps (referred herein as "the 10-4-3 PSA cycle").

In another embodiment of the invention, the PSA system can be utilized in turndown mode with nine beds. The PSA cycle for the nine beds would include eighteen steps, where three beds are in adsorption and has four equalization steps in addition to the purging and product pressurization steps (referred herein as "the 9-3-4 PSA cycle").

In a further embodiment of the invention, the PSA system has eight beds and employs sixteen steps in the cycle where three of the beds are simultaneously in the adsorption phase, and each bed has at least three equalization steps with another bed in addition to purging and product pressurization steps (referred herein as "the 8-3-3 PSA cycle").

In yet another embodiment, the PSA system has seven beds and employs twenty-one steps in the cycle where two of the beds are simultaneously in the adsorption phase, and each bed has at least three equalization steps (i.e., with another bed in the system) in addition to purging and product pressurization steps (referred herein as "the 7-2-3 PSA cycle").

In another embodiment, the PSA system has six beds and employs eighteen steps in the cycle where two of the beds are simultaneously in the adsorption phase, and each bed has at least three bed-to-bed equalization steps in addition to purging and product pressurization steps (referred herein as "the 6-2-3 PSA cycle").

In a further embodiment, the PSA system has five beds and employs fifteen steps in the cycle where two of the beds are simultaneously in the adsorption phase, and each bed has at least two bed-to-bed equalization steps in addition to purging and product pressurization steps (referred herein as "the 5-2-2 PSA cycle"). These latter cycles (i.e. the 9-3-4 PSA cycle, the 8-3-3 PSA cycle, the 7-2-3 PSA cycle, the 6-2-3 PSA cycle, and the 5-2-2 PSA cycle) are discussed in detail in co-pending and co-owned Ser. No. 13/004,731, which is incorporated herein by reference.

Figure 3:
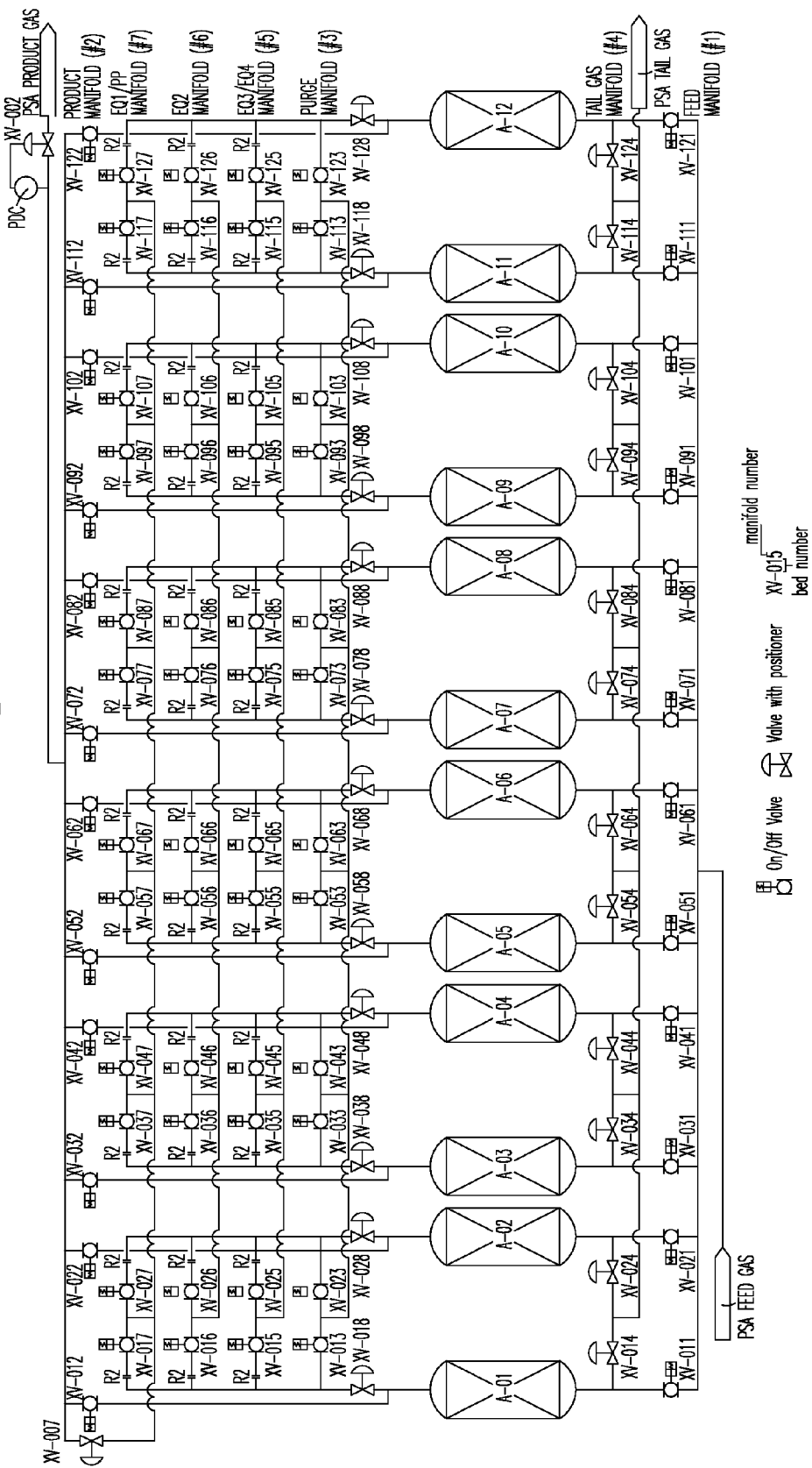
FIG. 3 is an illustrative twelve bed $H_2$ PSA system/skid utilized with the cycles of the present invention.

With reference to FIG. 3 and Tables 2 and 3, the mode of operation for the 12-4-4 PSA cycle is illustrated. Specifically, the sequence of steps for the 12-4-4 PSA cycle is performed in the order recited in each of the adsorption vessels in turn.

TABLE 2

12-4-4 PSA cycle chart

| Bed# | Step: | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | A1 | A2 | A3 | A4 | A5 | A6 | A7 | A8 | E1 | E2 | E3 | E4 |
| 2 | E1' | PP | A1 | A2 | A3 | A4 | A5 | A6 | A7 | A8 | E1 | E2 |
| 3 | E3' | E2' | E1' | PP | A1 | A2 | A3 | A4 | A5 | A6 | A7 | A8 |
| 4 | PG1 | E4' | E3' | E2' | E1' | PP | A1 | A2 | A3 | A4 | A5 | A6 |
| 5 | PG3 | PG2 | PG1 | E4' | E3' | E2' | E1' | PP | A1 | A2 | A3 | A4 |
| 6 | PPG3/BD1 | BD2 | PG3 | PG2 | PG1 | E4' | E3' | E2' | E1' | PP | A1 | A2 |

TABLE 2-continued 12-4-4 PSA cycle chart

| | | | | | | | | | | | |
|---|---|---|---|---|---|---|---|---|---|---|---|
| 7 | PPG1 | PPG2 | PPG3/BD1 | BD2 | PG3 | PG2 | PG1 | E4' | E3' | E2' | E1' | PP |
| 8 | E3 | E4 | PPG1 | PPG2 | PPG3/BD1 | BD2 | PG3 | PG2 | PG1 | E4' | E3' | E2' |
| 9 | E1 | E2 | E3 | E4 | PPG1 | PPG2 | PPG3/BD1 | BD2 | PG3 | PG2 | PG1 | E4' |
| 10 | A7 | A8 | E1 | E2 | E3 | E4 | PPG1 | PPG2 | PPG3/BD1 | BD2 | PG3 | PG2 |
| 11 | A5 | A6 | A7 | A8 | E1 | E2 | E3 | E4 | PPG1 | PPG2 | PPG3/BD1 | BD2 |
| 12 | A3 | A4 | A5 | A6 | A7 | A8 | E1 | E2 | E3 | E4 | PPG1 | PPG2 |

| | Step: | | | | | | | | | | |
|---|---|---|---|---|---|---|---|---|---|---|---|
| Bed# | 13 | 14 | 15 | 16 | 17 | 18 | 19 | 20 | 21 | 22 | 23 | 24 |
| 1 | PGG1 | PPG2 | PPG3/BD1 | BD2 | PG3 | PG2 | PG1 | E4' | E3' | E2' | E1' | PP |
| 2 | E3 | E4 | PPG1 | PPG2 | PPG3/BD1 | BD2 | PG3 | PG2 | PG1 | E4' | E3' | E2' |
| 3 | E1 | E2 | E3 | E4 | PPG1 | PPG2 | PPG3/BD1 | BD2 | PG3 | PG2 | PG1 | E4' |
| 4 | A7 | A8 | E1 | E2 | E3 | E4 | PPG1 | PPG2 | PPG3/BD1 | BD2 | PG3 | PG2 |
| 5 | A5 | A6 | A7 | A8 | E1 | E2 | E3 | E4 | PPG1 | PPG2 | PPG3/BD1 | BD2 |
| 6 | A3 | A4 | A5 | A6 | A7 | A8 | E1 | E2 | E3 | E4 | PPG1 | PPG2 |
| 7 | A1 | A2 | A3 | A4 | A5 | A6 | A7 | A8 | E1 | E2 | E3 | E4 |
| 8 | E1' | PP | A1 | A2 | A3 | A4 | A5 | A6 | A7 | A8 | E1 | E2 |
| 9 | E3' | E2' | E1' | PP | A1 | A2 | A3 | A4 | A5 | A6 | A7 | A8 |
| 10 | PG1 | E4' | E3' | E2' | E1' | PP | A1 | A2 | A3 | A4 | A5 | A6 |
| 11 | PG3 | PG2 | PG1 | E4' | E3' | E2' | E1' | PP | A1 | A2 | A3 | A4 |
| 12 | PPG3/BD1 | BD2 | PG3 | PG2 | PG1 | E4' | E3' | E2' | E1' | PP | A1 | A2 |

It will be understood that the nomenclature provided for this 12-4-4 PSA cycle is the same for all the cycles discussed herein, where:
A1=First Adsorption Step
A2=Second Adsorption Step
A3=Third Adsorption Step
A4=Fourth Adsorption Step
A5=Fifth Adsorption Step
A6=Sixth Adsorption Step
A7=Seventh Adsorption Step
A8=Eighth Adsorption Step
E1=First Equalization Down
E2=Second Equalization Down
E3=Third Equalization Down
E4=Fourth Equalization Down
PPG1=First Provide Purge Gas
PPG2=Second Provide Purge Gas
PPG3/BD1=Third Provide Purge Gas/First Blowdown
BD2=Second Blowdown
PG3=Purge using gas from PPG3 step
PG2=Purge using gas from PPG2 step
PG1=Purge using gas from PPG1 step
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization In some of the cycles, and as the particular cycle may require, the following additional nomenclature shall be employed:
E5=Fifth Equalization Down Step
E6=Sixth Equalization Down Step
E5'=Fifth Equalization Up (using gas from E5 Step)
E6'=Sixth Equalization Up (using gas from E6 Step)

In Table 2, the rows correspond to a particular bed in the PSA system, while the columns represent the step number. The duration of one cycle sequence (one row) is referred to as the total cycle time or cycle time (CT). The cycle time is constant for each bed. The relative shift in the cycle steps among the beds can be inferred from Table 2, as well. This shift is equal to $1/12^{th}$ of the CT since there are twelve beds in this particular cycle. In order for the 12-4-4 PSA cycle to be fully defined the step times for steps 1 and 2 must be assigned—such as $t_1$, and $t_2$ since the cycle has twenty-four steps. The duration of basic block is then defined as $t_1+t_2$. Employing the cycle periodicity described above, the $CT=12*(t_1+t_2)$ and it follows that the duration of the odd numbered steps is equal in time to $t_1$ and the even numbered steps is equal to $t_2$. Hence, there are twenty-four steps in the cycle, and the mode of operation for each bed is offset by two steps.

The 12-4-4 PSA cycle sequence is now described with respect to one bed which undergoes the entire PSA cycle (i.e., CT). A representative PSA train/skid system having twelve beds in parallel is depicted in FIG. 3, and is employed herein to illustrate this embodiment. The system includes 72 on/off valves, and 26 control valves, 7 manifolds and associate piping and fitting. The control valves are utilized to control the flow rate or pressure during certain process steps while the on/off valves allow communication between the various beds in the PSA system. The valve nomenclature utilized is such that the first two digits in the valve tag number correspond to bed number and the last digit designates the manifold number. By cross-referencing the bed and manifold designation each valve has a unique tag number—these valves are referred to as cycling valves. For purposes of clarity, valve tag numbers starting with two zeros such as product pressure control valve 002 or repressurization control valve 007 are not associated with any of the beds—process valves.

The valve sequencing representing the steps in the 12-4-4 PSA cycle of FIG. 3 is illustrated in Table 3, below, where the valve chart defines the position or action for each valve (i.e., open=O, closed=C, and CV=control valve in open position employing positioned to vary flow rate) in a particular step of the PSA cycle.

TABLE 3

12-4-4 PSA cycle valve chart

| Step # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| XV-001 | C | CV | C | CV | C | CV | C | CV | C | CV | C | CV | C | CV | C | CV | C | CV | C | CV | C | CV | C | CV |
| XV-002 | CV | CV | CV | CV | CV | CV | CV | CV | CV | CV | CV | CV | CV | CV | CV | CV | CV | CV | CV | CV | CV | CV | CV | CV |
| XV-011 | O | O | O | O | O | O | O | O | C | C | C | C | C | C | C | C | C | C | C | C | C | C | C | C |
| XV-012 | O | O | O | O | O | O | O | O | C | C | C | C | C | C | C | C | C | C | C | C | C | C | C | C |
| XV-013 | C | C | C | C | C | C | C | C | C | C | C | C | O | O | O | O | O | O | C | C | C | C | C | C |
| XV-014 | C | C | C | C | C | C | C | C | C | C | C | C | C | C | C | CV | CV | CV | CV | CV | C | C | C | C |
| XV-015 | C | C | C | C | C | C | C | C | C | C | C | O | O | C | C | C | C | C | C | O | O | C | C | C |
| XV-016 | C | C | C | C | C | C | C | C | C | O | O | C | C | C | C | C | C | C | C | C | O | O | C | C |
| XV-017 | C | C | C | C | C | C | C | C | O | C | C | C | C | C | C | C | C | C | C | C | C | C | O | O |
| XV-018 | C | C | C | C | C | C | C | C | CV | CV | CV | CV | CV | CV | CV | C | O | O | O | O | O | O | O | O |
| XV-021 | C | C | O | O | O | O | O | O | O | O | C | C | C | C | C | C | C | C | C | C | C | C | C | C |
| XV-022 | C | C | O | O | O | O | O | O | O | O | C | C | C | C | C | C | C | C | C | C | C | C | C | C |
| XV-023 | C | C | C | C | C | C | C | C | C | C | C | C | C | C | C | O | O | C | O | O | C | C | C | C |
| XV-024 | C | C | C | C | C | C | C | C | C | C | C | C | C | C | C | C | CV | CV | CV | CV | CV | C | C | C |
| XV-025 | C | C | C | C | C | C | C | C | C | C | C | C | C | O | O | C | C | C | C | C | O | O | C | C |
| XV-026 | C | C | C | C | C | C | C | C | C | C | C | O | O | C | C | C | C | C | C | C | C | C | O | O |
| XV-027 | O | O | C | C | C | C | C | C | C | O | C | C | C | C | C | C | C | C | C | C | C | C | C | C |
| XV-028 | O | O | C | C | C | C | C | C | C | C | CV | CV | CV | CV | CV | CV | CV | C | O | O | O | O | O | O |
| XV-031 | C | C | C | C | O | O | O | O | O | O | O | O | C | C | C | C | C | C | C | C | C | C | C | C |
| XV-032 | C | C | C | C | O | O | O | O | O | O | O | O | C | C | C | C | C | C | C | C | C | C | C | C |
| XV-033 | C | C | C | C | C | C | C | C | C | C | C | C | C | C | C | C | O | O | C | O | O | C | C | C |
| XV-034 | C | C | C | C | C | C | C | C | C | C | C | C | C | C | C | C | C | C | CV | CV | CV | CV | CV | C |
| XV-035 | C | C | C | C | C | C | C | C | C | C | C | C | C | C | C | O | O | C | C | C | C | C | O | O |
| XV-036 | O | O | C | C | C | C | C | C | C | C | C | C | O | O | C | C | C | C | C | C | C | C | C | C |
| XV-037 | C | C | O | O | C | C | C | C | C | C | C | O | C | C | C | C | C | C | C | C | C | C | C | C |
| XV-038 | O | O | O | O | C | C | C | C | C | C | C | CV | CV | CV | CV | CV | CV | CV | C | O | O | O | O | O |
| XV-041 | C | C | C | C | C | C | O | O | O | O | O | O | O | O | C | C | C | C | C | C | C | C | C | C |
| XV-042 | C | C | C | C | C | C | O | O | O | O | O | O | O | O | C | C | C | C | C | C | C | C | C | C |
| XV-043 | C | C | C | C | C | C | C | C | C | C | C | C | C | C | C | C | C | C | C | C | O | O | C | O |
| XV-044 | CV | C | C | C | C | C | C | C | C | C | C | C | C | C | C | C | C | C | C | C | C | CV | CV | CV |
| XV-045 | O | O | C | C | C | C | C | C | C | C | C | C | C | C | C | C | O | O | C | C | C | C | C | C |
| XV-046 | C | C | O | O | C | C | C | C | C | C | C | C | C | C | C | O | O | C | C | C | C | C | C | C |
| XV-047 | C | C | C | C | O | O | C | C | C | C | C | C | C | C | O | C | C | C | C | C | C | C | C | C |
| XV-048 | O | O | O | O | O | O | C | C | C | C | C | C | C | C | CV | CV | CV | CV | CV | CV | CV | C | O | O |
| XV-051 | C | C | C | C | C | C | C | C | O | O | O | O | O | O | O | C | C | C | C | C | C | C | C | C |
| XV-052 | C | C | C | C | C | C | C | C | O | O | O | O | O | O | O | C | C | C | C | C | C | C | C | C |
| XV-053 | O | O | C | C | C | C | C | C | C | C | C | C | C | C | C | C | C | C | C | C | C | O | O | C |
| XV-054 | CV | CV | CV | C | C | C | C | C | C | C | C | C | C | C | C | C | C | C | C | C | C | C | CV | CV |
| XV-055 | C | C | O | O | C | C | C | C | C | C | C | C | C | C | C | C | C | C | C | O | O | C | C | C |
| XV-056 | C | C | C | C | O | O | C | C | C | C | C | C | C | C | C | C | C | O | O | C | C | C | C | C |
| XV-057 | C | C | C | C | C | C | O | O | C | C | C | C | C | C | C | C | O | C | C | C | C | C | C | C |
| XV-058 | O | O | O | O | O | O | O | O | C | C | C | C | C | C | C | C | CV | CV | CV | CV | CV | CV | CV | C |
| XV-061 | C | C | C | C | C | C | C | C | C | O | O | O | O | O | O | O | C | C | C | C | C | C | C | C |
| XV-062 | C | C | C | C | C | C | C | C | C | O | O | O | O | O | O | O | C | C | C | C | C | C | C | C |
| XV-063 | O | C | O | O | C | C | C | C | C | C | C | C | C | C | C | C | C | C | C | C | C | C | C | O |
| XV-064 | CV | CV | CV | CV | CV | C | C | C | C | C | C | C | C | C | C | C | C | C | C | C | C | C | C | C |
| XV-065 | C | C | C | C | O | O | C | C | C | C | C | C | C | C | C | C | C | C | C | C | O | O | C | C |
| XV-066 | C | C | C | C | C | C | O | O | C | C | C | C | C | C | C | C | C | C | C | O | O | C | C | C |
| XV-067 | C | C | C | C | C | C | C | C | O | O | C | C | C | C | C | C | C | O | C | C | C | C | C | C |
| XV-068 | CV | C | O | O | O | O | O | O | O | O | C | C | C | C | C | C | C | C | C | CV | CV | CV | CV | CV |
| XV-071 | C | C | C | C | C | C | C | C | C | C | C | O | O | O | O | O | O | O | O | C | C | C | C | C |
| XV-072 | C | C | C | C | C | C | C | C | C | C | C | O | O | O | O | O | O | O | O | C | C | C | C | C |
| XV-073 | C | O | O | C | O | O | C | C | C | C | C | O | C | C | C | C | C | C | C | C | C | C | C | C |
| XV-074 | C | C | CV | CV | CV | CV | CV | C | C | C | C | C | C | C | C | C | C | C | C | C | C | C | C | C |
| XV-075 | O | C | C | C | C | O | O | C | C | C | C | C | C | C | C | C | C | C | C | C | C | C | C | O |
| XV-076 | C | C | C | C | C | C | C | O | O | C | C | C | C | C | C | C | C | C | C | C | C | O | O | C |
| XV-077 | C | C | C | C | C | C | C | C | C | O | O | C | C | C | C | C | C | C | O | C | C | C | C | C |
| XV-078 | CV | CV | CV | C | O | O | O | O | O | O | O | C | C | C | C | C | C | C | C | C | C | CV | CV | CV |
| XV-081 | C | C | C | C | C | C | C | C | C | C | C | C | C | O | O | O | O | O | O | O | C | C | C | C |
| XV-082 | C | C | C | C | C | C | C | C | C | C | C | C | C | O | O | O | O | O | O | O | C | C | C | C |
| XV-083 | C | C | C | O | O | C | O | O | C | C | C | C | C | O | C | C | C | C | C | C | C | C | C | C |
| XV-084 | C | C | C | C | CV | CV | CV | CV | CV | C | C | C | C | C | C | C | C | C | C | C | C | C | C | C |
| XV-085 | C | O | O | C | C | C | C | O | O | C | C | C | C | C | C | C | C | C | C | C | C | C | C | C |
| XV-086 | O | C | C | C | C | C | C | C | C | O | O | C | C | C | C | C | C | C | C | C | C | C | C | O |
| XV-087 | C | C | C | C | C | C | C | C | C | C | O | O | C | C | C | C | C | C | C | C | C | O | C | C |
| XV-088 | CV | CV | CV | CV | CV | C | O | O | O | O | O | O | C | C | C | C | C | C | C | C | C | C | CV | CV |
| XV-091 | C | C | C | C | C | C | C | C | C | C | C | C | C | C | C | O | O | O | O | O | O | O | O | C |
| XV-092 | C | C | C | C | C | C | C | C | C | C | C | C | C | C | C | O | O | O | O | O | O | O | O | C |
| XV-093 | C | C | C | C | C | O | O | C | O | O | C | C | C | C | C | C | C | C | C | C | C | C | C | C |
| XV-094 | C | C | C | C | C | C | CV | CV | CV | CV | CV | C | C | C | C | C | C | C | C | C | C | C | C | C |

TABLE 3-continued 12-4-4 PSA cycle valve chart

| Step # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| XV-095 | C | C | C | O | O | C | C | C | C | C | O | O | C | C | C | C | C | C | C | C | C | C | C | C |
| XV-096 | C | O | O | C | C | C | C | C | C | C | C | C | O | O | C | C | C | C | C | C | C | C | C | C |
| XV-097 | O | C | C | C | C | C | C | C | C | C | C | C | C | C | O | O | C | C | C | C | C | C | C | C |
| XV-098 | CV | CV | CV | CV | CV | CV | CV | C | O | O | O | O | O | O | O | O | C | C | C | C | C | C | C | C |
| XV-101 | O | O | C | C | C | C | C | C | C | C | C | C | C | C | C | C | C | C | O | O | O | O | O | O |
| XV-102 | O | O | C | C | C | C | C | C | C | C | C | C | C | C | C | C | C | C | O | O | O | O | O | O |
| XV-103 | C | C | C | C | C | C | C | O | O | C | O | O | C | C | C | C | C | C | C | C | C | C | C | C |
| XV-104 | C | C | C | C | C | C | C | C | CV | CV | CV | CV | CV | C | C | C | C | C | C | C | C | C | C | C |
| XV-105 | C | C | C | C | C | O | O | C | C | C | C | C | O | O | C | C | C | C | C | C | C | C | C | C |
| XV-106 | C | C | C | O | O | C | C | C | C | C | C | C | C | C | O | O | C | C | C | C | C | C | C | C |
| XV-107 | C | C | O | C | C | C | C | C | C | C | C | C | C | C | C | O | O | C | C | C | C | C | C | C |
| XV-108 | C | C | CV | CV | CV | CV | CV | CV | CV | C | O | O | O | O | O | O | O | O | C | C | C | C | C | C |
| XV-111 | O | O | O | O | C | C | C | C | C | C | C | C | C | C | C | C | C | C | C | O | O | O | O | O |
| XV-112 | O | O | O | O | C | C | C | C | C | C | C | C | C | C | C | C | C | C | C | O | O | O | O | O |
| XV-113 | C | C | C | C | C | C | C | C | C | O | O | C | O | O | C | C | C | C | C | C | C | C | C | C |
| XV-114 | C | C | C | C | C | C | C | C | C | C | CV | CV | CV | CV | CV | C | C | C | C | C | C | C | C | C |
| XV-115 | C | C | C | C | C | C | C | O | O | C | C | C | C | O | O | C | C | C | C | C | C | C | C | C |
| XV-116 | C | C | C | C | C | O | O | C | C | C | C | C | C | C | C | O | O | C | C | C | C | C | C | C |
| XV-117 | C | C | C | C | O | C | C | C | C | C | C | C | C | C | C | C | C | O | O | C | C | C | C | C |
| XV-118 | C | C | C | C | CV | CV | CV | CV | CV | CV | CV | C | O | O | O | O | O | O | O | O | C | C | C | C |
| XV-121 | O | O | O | O | O | O | C | C | C | C | C | C | C | C | C | C | C | C | C | C | C | C | O | O |
| XV-122 | O | O | O | O | O | O | C | C | C | C | C | C | C | C | C | C | C | C | C | C | C | C | O | O |
| XV-123 | C | C | C | C | C | C | C | C | C | C | O | O | C | O | O | C | C | C | C | C | C | C | C | C |
| XV-124 | C | C | C | C | C | C | C | C | C | C | C | CV | CV | CV | CV | CV | C | C | C | C | C | C | C | C |
| XV-125 | C | C | C | C | C | C | C | C | C | O | O | C | C | C | C | O | O | C | C | C | C | C | C | C |
| XV-126 | C | C | C | C | C | C | O | O | C | C | C | C | C | C | C | C | O | O | C | C | C | C | C | C |
| XV-127 | C | C | C | C | C | C | O | C | C | C | C | C | C | C | C | C | C | C | O | O | C | C | C | C |
| XV-128 | C | C | C | C | C | C | CV | CV | CV | CV | CV | CV | CV | C | O | O | O | O | O | O | O | O | C | C |

Step Nos. 1-8 (A1-A8): Bed 1 commences the process cycle in the first adsorption step (A1). The feed gas mixture is introduced to the bottom of Bed 1 from the first manifold (i.e., feed manifold) at high pressure. Both valves 011 (i.e., XV-011) and 012 (i.e., XV-012) are open while all other Bed 1 valves (e.g., 01$x$) are closed. Hereinafter, valve tag numbers will be referred to without using the prefix XV. In addition to Bed 1, Bed 10, Bed 11 and Bed 12 are processing feed in the first step. As a result, valves 101, 102, 111, 112, 121 and 122 will be open, as well. The feed mixture flows from the bottom to the top of Bed 1 (although this is also the case for Bed 9 and Bed 10 in step 1). This upward flow direction in the vessel will be referred to as co-current flow with respect to feed, throughout this application. During adsorption step, the impurities are adsorbed on to the adsorbents and high purity hydrogen is collected in the second product manifold. Control valve 002 is used to control the pressure in beds in the adsorption or feed/production step. Bed 1 remains in the adsorption step during the steps one through eight of the 12-4-4 cycle.

Step No. 9 (E1): Bed 1 undergoes the first bed-to-bed equalization step (E1) while the Bed 6 is counter-currently receiving the equalization gas—step (E1') via the first manifold. See FIG. 3. This bed-to-bed equalization step is sometimes referred to as co-current depressurization step. Bed 1 valves 017, 018 and Bed 6 valves 067 and 068 are open while all other Bed 1 and Bed 6 valves (01$x$) and (05$x$) are closed. The rate of (E1)-(E1') steps is controlled by control valve 018.

Step No. 10 (E2): Bed 1 undergoes the second equalization step (E2). Bed 1 pressure drops due to co-current gas flow from Bed 1 to Bed 7 undergoing step (E2') via the sixth manifold. The pressures in both beds are equal at the end of this Step No. 10. Valves 016, 076 and 078 are fully open while valve 018 controls the rate of (E2)-(E2') steps.

Step No. 11 (E3): Bed 1 executes the third equalization down step (E3). This step uses equalization manifold number six dedicated for the second and third equalization steps of the 12-4-4 cycle. Valves 016, 086 and 088 are fully open while valve 018 controls the rate of (E3)-(E3') steps.

Step No. 12 (E4): Bed 1 executes the fourth equalization step (E4) sending the gas to Bed 9 via the fifth manifold. Valves 015, 095 and 098 are fully open while valve 018 controls the rate of (E4)-(E4') steps.

Step No. 13 (PPG1): In this step, Bed 1 co-currently sends the purge gas to the bed in the purge step (PG1). As shown in Table 2, above, the bed being purged during this step is Bed 10 utilizing manifold number 5. It follows that Bed 1 valve 015 is open and control valve 018 is controlling the rate of (PPG1) step.

The (PPG3) step and the (PPG1) step occur simultaneously during the odd cycle steps (i.e. step 1, 3, 5 etc.). Thus, separate manifolds must be used for each PPG1 and PPG3 gas in order to comply with the sequential refluxing protocol. The purge gases cannot be mixed, so as to keep the hydrogen rich purge gas (PPG1) separate from hydrogen lean purge gas (PPG3). Since the (PPG1) gas comes from the bed at a higher pressure than the (PPG2) or (PPG3) gas, it contains low level of impurities—hydrogen rich purge gas. In order to maximize the adsorbent regeneration the hydrogen lean gas should be used first (Step No. 17—(PG3) step) and then gases richer in hydrogen such as PPG2 gas in Step No. 18—(PG2) step and PPG1 gas last in Step No. 19—(PG1) step. This concept known as sequential refluxing protocol will always yield the highest mass-transfer driving force resulting in more efficient regeneration process.

Step No. 14 (PPG2): In this step, Bed 1 co-currently sends the purge gas to Bed 11, which is in the purge step (PG2). Both the PPG2 and PPG3 steps utilize the third manifold. Valve 013 is open and the control valve 018 is used to control the rate of this provide purge steps PPG2 and PPG3 (the latter being in Step No. 15).

Step No. 15 (PPG3/BD1): The purpose of this step is to provide purge gas for Bed 12 using manifold number three and at the same time rid the vessel of the impurities adsorbed during co-current steps (AD, EQ, PPG) through the bottom of the vessel. To accomplish these two overlapping steps valve 013 is open, valve 018 is used to control the rate of (PPG3) step and valve 014 controls the rate of (BD1) step. The relative flows during the (PPG3) step and the overlapping (BD1) step are controlled so that the minimum purge gas requirement is fulfilled in the PSA process.

Step No. 16 (BD2): At this point in cycle, the pressure in the vessel is too low to hold on to the impurities. As a result, they are desorbed and counter-currently directed to the surge drum through valve 014. All other valves associated with Bed 1 are closed during this step.

Step No. 17 (PG3): As designated in Table 2, this is the purge step (PG3). Bed 1 is receiving the purge gas from the bed in (PPG3) step (i.e., Bed 2) through the third manifold. Valves 013, 018 are fully open, and the bed pressure during the purge step is controlled by valve 014.

Step No. 18 (PG2): In this step, Bed 1 receives purge gas from the Bed 3, which is in the PPG2 step via the third manifold. Valves 013 and 018 are fully open, while the bed pressure during the purge step is controlled by valve 014.

Step No. 19 (PG1): In this step, Bed 1 is receiving purge gas from the bed in the (PPG1) step through the fifth manifold (i.e., Bed 4). Valves 015 and 018 are fully open, while the bed pressure during the purge step is controlled by valve 014.

Step No. 20 (E4'): Is the first equalization up designated as (E4') step to reference the bed receiving the gas. The beds in (E4) and (E4') steps are interacting such that the content of Bed 5 is transferred to Bed 1 until the pressure in both beds is equalized. Valves 055, 015 and 018 are fully open and the action of control valve 058 provides means to control the rate.

Step No. 21 (E3'): In this second equalization up step (E3') step, Bed 1 is receiving gas from Bed 6. Valves 016, 066 and 018 are fully open and the action of control valve 068 provides means to control the rate.

Step No. 22, (E2'): In this step, Bed 1 is receiving gas from Bed 7, while valves 016, 076 and 018 are fully open and the action of control valve 078 provides means to control the rate.

Step No. 23 (E1'): This is the last equalization up step, where Bed 1 receives the gas from Bed 8. Valves 017, 087 and 018 are fully open and the action of control valve 088 provides means to control the rate.

Step No. 24 (PP): The last step in the cycle description with regards to Bed 1 is the product pressurization "PP" step. A portion of the product gas from the second manifold is used to further raise the pressure in the bed by using the control valve 007. Valves 017 and 018 are fully open during this step.

Basic functionality of the cycle can be described in the same fashion for each one of the twelve beds in the PSA system. However, once the step sequence for one bed is defined the step sequences for other beds will follow in the same order and the relative time shift will be $\frac{1}{12}^{th}$ of CT or $(t_1+t_2)$ (i.e., Bed 2 starts the first adsorption (A1) in the third step as compared to Bed 1 that undergoes the first adsorption (A1) in the first step).

Alternative way for describing a cycle chart is to provide information on all of the beds for the duration of the unit block. For example, by defining all cycle steps in Step No. 1 and Step No. 2 for the 12-4-4 PSA cycle in Table 2 one has qualitatively defined all possible interactions among beds, valves and manifolds. The same sequence will be periodically repeating with period equal to $t_1+t_2$.

This new method will be used to explain the functionality of the inventive 11-4-4 PSA cycle of the present invention. This is the first turndown mode for the twelve bed $H_2$ PSA process. If for maintenance purposes one of the beds needs to be serviced it'll be isolated from the process and the hydrogen production will continue using a process cycle operating with eleven beds. This new 11-4-4 cycle offers better performance in terms of throughput and recovery compared to the related art 11-3-3 cycle (not shown).

Since the 11-4-4 PSA cycle has twenty-two steps and utilizing eleven beds the unit block will be defined by duration two steps $t_1+t_2$ where the total cycle time $CT=11*(t_1+t_2)$. By describing all events and interactions for the first two steps the cycle is fully defined. For illustrative purpose, FIG. 3 ought to be utilized together with Table 4, below.

TABLE 4

11-4-4 cycle chart
(12 Bed H2PSA System Turndown to 11 Bed Mode of Operation)

| Bed# | \multicolumn{11}{c}{Step:} | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | A1 | A2 | A3 | A4 | A5 | A6 | A7 | A8 | E1 | E2 | E3 |
| 2 | E1' | PP | A1 | A2 | A3 | A4 | A5 | A6 | A7 | A8 | E1 |
| 3 | E3' | E2' | E1' | PP | A1 | A2 | A3 | A4 | A5 | A6 | A7 |
| 4 | PG1 | E4' | E3' | E2' | E1' | PP | A1 | A2 | A3 | A4 | A5 |
| 5 | BD | PG2 | PG1 | E4' | E3' | E2' | E1' | PP | A1 | A2 | A3 |
| 6 | PPG1 | PPG2 | BD | PG2 | PG1 | E4' | E3' | E2' | E1' | PP | A1 |
| 7 | E3 | E4 | PPG1 | PPG2 | BD | PG2 | PG1 | E4' | E3' | E2' | E1' |
| 8 | E1 | E2 | E3 | E4 | PPG1 | PPG2 | BD | PG2 | PG1 | E4' | E3' |
| 9 | A7 | A8 | E1 | E2 | E3 | E4 | PPG1 | PPG2 | BD | PG2 | PG1 |
| 10 | A5 | A6 | A7 | A8 | E1 | E2 | E3 | E4 | PPG1 | PPG2 | BD |
| 11 | A3 | A4 | A5 | A6 | A7 | A8 | E1 | E2 | E3 | E4 | PPG1 |

| Bed# | \multicolumn{11}{c}{Step:} | | | | | | | | | | |
|---|---|---|---|---|---|---|---|---|---|---|---|
| | 12 | 13 | 14 | 15 | 16 | 17 | 18 | 19 | 20 | 21 | 22 |
| 1 | E4 | PPG1 | PPG2 | BD | PG2 | PG1 | E4' | E3' | E2' | E1' | PP |
| 2 | E2 | E3 | E4 | PPG1 | PPG2 | BD | PG2 | PG1 | E4' | E3' | E2' |
| 3 | A8 | E1 | E2 | E3 | E4 | PPG1 | PPG2 | BD | PG2 | PG1 | E4' |
| 4 | A6 | A7 | A8 | E1 | E2 | E3 | E4 | PPG1 | PPG2 | BD | PG2 |
| 5 | A4 | A5 | A6 | A7 | A8 | E1 | E2 | E3 | E4 | PPG1 | PPG2 |
| 6 | A2 | A3 | A4 | A5 | A6 | A7 | A8 | E1 | E2 | E3 | E4 |
| 7 | PP | A1 | A2 | A3 | A4 | A5 | A6 | A7 | A8 | E1 | E2 |
| 8 | E2' | E1' | PP | A1 | A2 | A3 | A4 | A5 | A6 | A7 | A8 |

TABLE 4-continued 11-4-4 cycle chart
(12 Bed H2PSA System Turndown to 11 Bed Mode of Operation)

| | | | | | | | | | | |
|---|---|---|---|---|---|---|---|---|---|---|
| 9 | E4' | E3' | E2' | E1' | PP | A1 | A2 | A3 | A4 | A5 | A6 |
| 10 | PG2 | PG1 | E4' | E3' | E2' | E1' | PP | A1 | A2 | A3 | A4 |
| 11 | PPG2 | BD | PG2 | PG1 | E4' | E3' | E2' | E1' | PP | A1 | A2 |

Step No. 1: Four beds are processing feed (adsorption step), namely Beds 1, Bed 9, Bed 10 and Bed 11. It follows that the valves 011, 012, 091, 092, 101, 102, 111 and 112 are in the open position. Bed 8 and Bed 2 are interacting such that bed 8 is sending equalization gas to Bed 2 through the seventh manifold. To achieve the (E1)-(E1') steps, valves 087, 027, 028 are open and valve 088 is used to control the rate. Bed 7 undergoing the third equalization step down (E3) is routing gas to Bed 3 through the sixth manifold. Valves 076, 036, 038 are open and valve 078 controls the rate of (E3)-(E3') steps. Bed 6 is providing the purge gas to purge the Bed 4. The rate of the (PPG1) step is controlled by valve 068, while valves 063, 043, 048 are fully open. Valve 044 controls the pressure in Bed 4. Bed 5 is in blowdown (BD) step in Step No. 1 of the 11-4-4 PSA cycle. The desorbed impurities exit the bed through control valve 054.

Step No. 2: Four beds are processing feed (i.e., adsorption step), namely Bed 1, Bed 9, Bed 10 and Bed 11. It follows that the valves 011, 012, 091, 092, 101, 102, 111 and 112 are in the open position. Bed 2 is in the product pressurization step (PP), (i.e., part of the product gas is recycled back to the process through the seventh manifold to raise the pressure in Bed 2. Valves 027 and 028 are open, while valve 007 controls the rate of this step. Bed 8 and Bed 3 are interacting such that Bed 8 is sending equalization gas to Bed 3 through the sixth manifold to achieve (E2)-(E2') steps. Valves 086, 036, 038 are open and valve 088 is used to control the rate. Bed 7 and Bed 4 are undergoing (E4)-(E4') steps utilizing the fifth manifold. Valves 075, 045, 048 are open and valve 078 is used to control the rate. Bed 6 is providing the purge gas to purge the Bed 5. The rate of the (PPG2) step is controlled by valve 068, while valves 063, 053, 058 are fully open and valve 054 controls the pressure in Bed 5. As discussed with respect to the 12-4-4 PSA cycle, the sequential refluxing protocol is followed in this cycle as well, where the hydrogen lean gas (PPG2) is utilized first and hydrogen rich gas (PPG1) is employed in the last purging step looking at any bed in Table 4.

Step No. 3: Features the same bed, valve and manifold interactions as Step No. 1, and the sequence will advance by one unit block. Thus, the valves which are open in Step No. 3 will be: adsorption step Bed 2, Bed 10, Bed 11 and Bed 1-valves 021, 022, 101, 102, 011, 012, 021 and 022. In the (E1)-(E1') steps, Bed 9 and Bed 3 are in communication-valves 097, 037, 038 are open and valve 098 is used to control the rate. In the (E3)-(E3') steps, Beds 8 and Bed 4 are in communication-valves 086, 046, 048 are open and valve 088 controls the rate. In the (PPG1)-(PG1) steps, bed No. 7 to Bed 5 communication-valves 078; 073, 053, 058 and control valve 054. Meanwhile, Bed 6 is in the blowdown step utilizing control valve 064.

In the event the plant operator needs to isolate an additional bed in the PSA system (i.e., turndown the PSA system), the inventive 10-4-3 PSA cycle of the present invention may be utilized. This cycle features four parallel feeds and three bed-to-bed equalization steps. It is a twenty step cycle, and by virtue of utilizing ten beds, the unit block will be defined by duration two steps $t_1+t_2$ and $CT=10*(t_1+t_2)$. By describing all events and interactions for the first two steps, the cycle will be fully defined. For illustrative purpose, FIG. 3 ought to be utilized together with Table 5, below.

TABLE 5

10-4-3 cycle chart
(12 Bed H$_2$ PSA System Turndown to 10 Bed Mode of Operation)

| Bed# | 1 | 2 | 3 | 4 | 5 | 6 | 7 | 8 | 9 | 10 |
|---|---|---|---|---|---|---|---|---|---|---|
| 1 | A1 | A2 | A3 | A4 | A5 | A6 | A7 | A8 | E1 | E2 |
| 2 | E1' | PP | A1 | A2 | A3 | A4 | A5 | A6 | A7 | A8 |
| 3 | E3' | E2' | E1' | PP | A1 | A2 | A3 | A4 | A5 | A6 |
| 4 | PG2 | PG1 | E3' | E2' | E1' | PP | A1 | A2 | A3 | A4 |
| 5 | PPG2 | BD | PG2 | PG1 | E3' | E2' | E1' | PP | A1 | A2 |
| 6 | E3 | PPG1 | PPG2 | BD | PG2 | PG1 | E3' | E2' | E1' | PP |
| 7 | E1 | E2 | E3 | PPG1 | PPG2 | BD | PG2 | PG1 | E3' | E2' |
| 8 | A7 | A8 | E1 | E2 | E3 | PPG1 | PPG2 | BD | PG2 | PG1 |
| 9 | A5 | A6 | A7 | A8 | E1 | E2 | E3 | PPG1 | PPG2 | BD |
| 10 | A3 | A4 | A5 | A6 | A7 | A8 | E1 | E2 | E3 | PPG1 |

| Bed# | 11 | 12 | 13 | 14 | 15 | 16 | 17 | 18 | 19 | 20 |
|---|---|---|---|---|---|---|---|---|---|---|
| 1 | E3 | PPG1 | PPG2 | BD | PG2 | PG1 | E3' | E2' | E1' | PP |
| 2 | E1 | E2 | E3 | PPG1 | PPG2 | BD | PG2 | PG1 | E3' | E2' |
| 3 | A7 | A8 | E1 | E2 | E3 | PPG1 | PPG2 | BD | PG2 | PG1 |
| 4 | A5 | A6 | A7 | A8 | E1 | E2 | E3 | PPG1 | PPG2 | BD |
| 5 | A3 | A4 | A5 | A6 | A7 | A8 | E1 | E2 | E3 | PPG1 |
| 6 | A1 | A2 | A3 | A4 | A5 | A6 | A7 | A8 | E1 | E2 |
| 7 | E1' | PP | A1 | A2 | A3 | A4 | A5 | A6 | A7 | A8 |
| 8 | E3' | E2' | E1' | PP | A1 | A2 | A3 | A4 | A5 | A6 |

TABLE 5-continued 10-4-3 cycle chart
(12 Bed H₂ PSA System Turndown to 10 Bed Mode of Operation)

| 9  | PG2  | PG1 | E3' | E2' | E1' | PP  | A1  | A2 | A3 | A4 |
| -- | ---- | --- | --- | --- | --- | --- | --- | -- | -- | -- |
| 10 | PPG2 | BD  | PG2 | PG1 | E3' | E2' | E1' | PP | A1 | A2 |

Step No. 1: Four beds are processing feed (i.e., adsorption step), namely Bed 1, Bed 8, Bed 9 and Bed 10. It follows that the valves 011, 012, 081, 082, 091, 092, 101 and 102 will be open. Bed 7 and Bed 2 are interacting such that Bed 7 is sending equalization gas to Bed 2 via the seventh manifold. To achieve the (E1)-(E1') steps, valves 077, 027, 028 are in the open position and valve 078 is used to control the rate. Bed 6 undergoes the third equalization step down (E3) routing gas to Bed 3 via the sixth manifold. Valves 066, 036, 038 are open and valve 068 is used to control the rate of (E3)-(E3') steps. Bed 5 is providing the hydrogen lean purge gas to purge the Bed 4. The rate of the (PPG2) step is controlled by valve 058, while valves 053, 043, 048 are fully open and valve 044 controls the pressure in Bed 4.

Step No. 2: Four beds are processing feed (adsorption step), namely Bed 1, Bed 8, Bed 9 and Bed 10. It follows that the valves 011, 012, 081, 082, 091, 092, 101 and 102 are in the open position. Bed 2 is in the product pressurization step (PP), (i.e., part of the product gas is recycled back to the process to raise the Bed 2 pressure). Valves 027 and 028 are open while valve 007 controls the rate of this step. Bed 7 and Bed 3 are interacting such that Bed 7 is sending equalization gas to Bed 3 via the sixth manifold. To achieve the (E2)-(E2') steps, valves 076, 036, 038 are open and valve 078 is used to control the rate. Bed 6 is providing the hydrogen rich purge gas to Bed 4. The rate of the (PPG1) step is controlled by valve 068, while valves 063, 043, 048 are fully open and valve 044 controls the pressure in Bed 4. Bed 5 is in blowdown (BD) step where the desorbed impurities exit the bed through control valve 054. As shown in Table 5, the 10-4-3 cycle follows the sequential refluxing protocol.

The alternative and novel 12-3-5 PSA cycle has twenty-four steps and utilizes twelve beds. Therefore, the unit block will be defined by duration of two steps $t_1+t_2$ and the total cycle time $CT=12*(t_1+t_2)$. This cycle features three parallel feeds and five bed-to-bed equalizations. By describing all events and interactions for the first two steps the cycle will be fully defined with reference to FIG. 3 and the cycle chart in Table 6.

TABLE 6

12-3-5 cycle chart (Alternative 12 Bed H₂ PSA System Operation)

| Bed# | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| 1 | A1 | A2 | A3 | A4 | A5 | A6 | E1 | E2 | E3 | E4 | E5 | PPG1 |
| 2 | E1' | PP | A1 | A2 | A3 | A4 | A5 | A6 | E1 | E2 | E3 | E4 |
| 3 | E3' | E2' | E1' | PP | A1 | A2 | A3 | A4 | A5 | A6 | E1 | E2 |
| 4 | E5' | E4' | E3' | E2' | E1' | PP | A1 | A2 | A3 | A4 | A5 | A6 |
| 5 | PG2 | PG1 | E5' | E4' | E3' | E2' | E1' | PP | A1 | A2 | A3 | A4 |
| 6 | BD | PG3 | PG2 | PG1 | E5' | E4' | E3' | E2' | E1' | PP | A1 | A2 |
| 7 | PPG2 | PPG3 | BD | PG3 | PG2 | PG1 | E5' | E4' | E3' | E2' | E1' | PP |
| 8 | E3 | PPG1 | PPG2 | PPG3 | BD | PG3 | PG2 | PG1 | E5' | E4' | E3' | E2' |
| 9 | E3 | E4 | E5 | PPG1 | PPG2 | PPG3 | BD | PG2 | PG3 | PG1 | E5' | E4' |
| 10 | E1 | E2 | E3 | E4 | E5 | PPG1 | PPG2 | PPG3 | BD | PG3 | PG2 | PG1 |
| 11 | A5 | A6 | E1 | E2 | E3 | E4 | E5 | PPG1 | PPG2 | PPG3 | BD | PG3 |
| 12 | A3 | A4 | A5 | A6 | E1 | E2 | E3 | E4 | E5 | PPG1 | PPG2 | PPG3 |

| Bed# | 13 | 14 | 15 | 16 | 17 | 18 | 19 | 20 | 21 | 22 | 23 | 24 |
| --- | --- | --- | --- | --- | --- | --- | --- | --- | --- | --- | --- | --- |
| 1 | PPG2 | PPG3 | BD | PG3 | PG2 | PG1 | E5' | E4' | E3' | E2' | E1' | PP |
| 2 | E5 | PPG1 | PPG2 | PPG3 | BD | PG3 | PG2 | PG1 | E5' | E4' | E3' | E2' |
| 3 | E3 | E4 | E5 | PPG1 | PPG2 | PPG3 | BD | PG3 | PG2 | PG1 | E5' | E4' |
| 4 | E1 | E2 | E3 | E4 | E5 | PPG1 | PPG2 | PPG3 | BD | PG3 | PG2 | PG1 |
| 5 | A5 | A6 | E1 | E2 | E3 | E4 | E5 | PPG1 | PPG2 | PPG3 | BD | PG3 |
| 6 | A3 | A4 | A5 | A6 | E1 | E2 | E3 | E4 | E5 | PPG1 | PPG2 | PPG3 |
| 7 | A1 | A2 | A3 | A4 | A5 | A6 | E1 | E2 | E3 | E4 | E5 | PPG1 |
| 8 | E1' | PP | A1 | A2 | A3 | A4 | A5 | A6 | E1 | E2 | E3 | E4 |
| 9 | E3' | E2' | E1' | PP | A1 | A2 | A3 | A4 | A5 | A6 | E1 | E2 |
| 10 | E5' | E4' | E3' | E2' | E1' | PP | A1 | A2 | A3 | A4 | A5 | A6 |
| 11 | PG2 | PG1 | E5' | E4' | E3' | E2' | E1' | PP | A1 | A2 | A3 | A4 |
| 12 | BD | PG3 | PG2 | PG1 | E5' | E4' | E3' | E2' | E1' | PP | A1 | A2 |

Step No. 1: Three beds are processing feed (adsorption step), namely Bed 1, Bed 11 and Bed 12. It follows that the valves 011, 012, 111, 112, 121 and 122 are in an open position. Bed 10 and Bed 2 are interacting such that Bed 10 is sending equalization gas to Bed 2 via the seventh manifold. To achieve the (E1)-(E1') steps, valves 107, 027, 028 are in an open position and valve 108 is used to control the rate. Bed 9 is undergoing the third equalization step down (E3) by routing gas to Bed 3 through the sixth manifold. Valves 096, 036, 038 are open and valve 098 is used to control the rate of (E3)-(E3') steps. Bed 8 undergoes the fifth equalization step down step (E5) by routing sending gas to Bed 4 via the fifth manifold. Valves 085, 045, 048 are in an open position, and valve 088 controls the rate of (E5)-(E5') steps. Bed 7 is providing the purge gas to Bed 5, and the rate of the (PPG2) step is controlled by valve 078. Valves 073, 053, 058 are fully open and valve 054 is used to control the pressure in Bed 5. Meanwhile, Bed 6 is in blowdown (BD), and the desorbed impurities exit the bed through control valve 064.

Step No. 2: Three beds are processing feed (adsorption step), namely Bed 1, Bed 11 and Bed 12. It follows that the valves 011, 012, 111, 112, 121 and 122 are in an open position. Bed 2 is in the product pressurization step (PP'''), (i.e., part of the product gas is recycled back to the process to raise the Bed 2 pressure). Valves 027 and 028 are open while valve 007 controls the rate of this step. Bed 10 and Bed 3 are interacting such that Bed 10 is sending equalization gas to Bed 3 through the sixth manifold. To achieve the (E2)-(E2') steps, valves 106, 036, 038 are open and valve 108 is employed to control the rate. Bed 9 undergoes the fourth equalization step down (E4) by routing gas to Bed 4 via the fifth manifold. Valves 095, 045, 048 are open and valve 098 controls the rate of (E4)-(E4') steps. Bed 8 and Bed 7 are providing the purge gas to the Bed 5 and Bed 6. The rate of the (PPG) steps is controlled by valves 078 and 088. Valves 083, 073, 063, 053, 068, 058 are fully open and valves 054 and 064 are used to control the pressures in Bed 5 and Bed 6, respectively. When using the 12-3-5 cycle with the process/skid shown in FIG. 3 the PPG1 and PPG3 gases are mixed in the third manifold so the sequential refluxing will not be followed in this case. However, the mixing of the PPG1 and PPG3 gases could be avoided by adding another purge manifold to the PSA system to enforce the sequential refluxing protocol.

While the performance of the PSA systems discussed above concerned twelve bed PSA cycles in normal operation and turndown, the plant can be scaled up to increase production capacities to about 150 MMSCFD of hydrogen. In one such PSA system, the number of beds can be increased to fourteen. The novel and inventive cycle provided herein is a 14-5-5 PSA cycle having twenty eight steps. The cycle unit block will be defined by duration two steps $t_1+t_2$ and the total cycle time $CT=14*(t_1+t_2)$. By describing all events and interactions for the first two steps the cycle will be fully defined. The cycle chart in Table 7 shows the cycle steps. FIG. 3, albeit a twelve bed process, it is utilized herein for illustration purposes of the fourteen bed system, assuming two additional beds being added to the process layout, in conjunction with the nomenclature employed above.

TABLE 7

Large Plant 14-5-5 cycle chart
(14 Bed H$_2$ PSA System Operation)

| Bed# | Step: 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | A1 | A2 | A3 | A4 | A5 | A6 | A7 | A8 | A9 | A10 | E1 | E2 | E3 | E4 |
| 2 | E1' | PP | A1 | A2 | A3 | A4 | A5 | A6 | A7 | A8 | A9 | A10 | E1 | E2 |
| 3 | E3' | E2' | E1' | PP | A1 | A2 | A3 | A4 | A5 | A6 | A7 | A8 | A9 | A10 |
| 4 | E5' | E4' | E3' | E2' | E1' | PP | A1 | A2 | A3 | A4 | A5 | A6 | A7 | A8 |
| 5 | PG2 | PG1 | E5' | E4' | E3' | E2' | E1' | PP | A1 | A2 | A3 | A4 | A5 | A6 |
| 6 | BD | PG3 | PG2 | PG1 | E5' | E4' | E3' | E2' | E1' | PP | A1 | A2 | A3 | A4 |
| 7 | PPG2 | PPG3 | BD | PG3 | PG2 | PG1 | E5' | E4' | E3' | E2' | E1' | PP | A1 | A2 |
| 8 | E3 | PPG1 | PPG2 | PPG3 | BD | PG3 | PG2 | PG1 | E5' | E4' | E3' | E2' | E1' | PP |
| 9 | E3 | E4 | E5 | PPG1 | PPG2 | PPG3 | BD | PG3 | PG2 | PG1 | E5' | E4' | E3' | E2' |
| 10 | E1 | E2 | E3 | E4 | E5 | PPG1 | PPG2 | PPG3 | BD | PG3 | PG2 | PG1 | E5' | E4' |
| 11 | A9 | A10 | E1 | E2 | E3 | E4 | E5 | PPG1 | PPG2 | PPG3 | BD | PG3 | PG2 | PG1 |
| 12 | A7 | A8 | A9 | A10 | E1 | E2 | E3 | E4 | E5 | PPG1 | PPG2 | PPG3 | BD | PG3 |
| 13 | A5 | A6 | A7 | A8 | A9 | A10 | E1 | E2 | E3 | E4 | E5 | PPG1 | PPG2 | PPG3 |
| 14 | A3 | A4 | A5 | A6 | A7 | A8 | A9 | A10 | E1 | E2 | E3 | E4 | E5 | PPG1 |

| Bed# | Step: 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| 1 | E5 | PPG1 | PPG2 | PPG3 | BD | PG3 | PG2 | PG1 | E5' | E4' | E3' | E2' | E1' | PP |
| 2 | E3 | E4 | E5 | PPG1 | PPG2 | PPG3 | BD | PG3 | PG2 | PG1 | E5' | E4' | E3' | E2' |
| 3 | E1 | E2 | E3 | E4 | E5 | PPG1 | PPG2 | PPG3 | BD | PG3 | PG2 | PG1 | E5' | E4' |
| 4 | A9 | A10 | E1 | E2 | E3 | E4 | E5 | PPG1 | PPG2 | PPG3 | BD | PG3 | PG2 | PG1 |
| 5 | A7 | A8 | A9 | A10 | E1 | E2 | E3 | E4 | E5 | PPG1 | PPG2 | PPG3 | BD | PG3 |
| 6 | A5 | A6 | A7 | A8 | A9 | A10 | E1 | E2 | E3 | E4 | E5 | PPG1 | PPG2 | PPG3 |
| 7 | A3 | A4 | A5 | A6 | A7 | A8 | A9 | A10 | E1 | E2 | E3 | E4 | E5 | PPG1 |
| 8 | A1 | A2 | A3 | A4 | A5 | A6 | A7 | A8 | A9 | A10 | E1 | E2 | E3 | E4 |
| 9 | E1' | PP | A1 | A2 | A3 | A4 | A5 | A6 | A7 | A8 | A9 | A10 | E1 | E2 |
| 10 | E3' | E2' | E1' | PP | A1 | A2 | A3 | A4 | A5 | A6 | A7 | A8 | A9 | A10 |
| 11 | E5' | E4' | E3' | E2' | E1' | PP | A1 | A2 | A3 | A4 | A5 | A6 | A7 | A8 |
| 12 | PG2 | PG1 | E5' | E4' | E3' | E2' | E1' | PP | A1 | A2 | A3 | A4 | A5 | A6 |
| 13 | BD | PG3 | PG2 | PG1 | E5' | E4' | E3' | E2' | E1' | PP | A1 | A2 | A3 | A4 |
| 14 | PPG2 | PPG3 | BD | PG3 | PG2 | PG1 | E5' | E4' | E3' | E2' | E1' | PP | A1 | A2 |

Step No. 1: Five beds are processing feed (adsorption step), namely Beds 1, Bed 11, Bed 12, Bed 13 and Bed 14. It follows that the valves 011, 012, 111, 112, 121, 122, 131, 132, 141 and 142 are in an open position. Bed 10 and Bed 2 are interacting such that Bed 10 is routing equalization gas to Bed 2 via the seventh manifold. To achieve the (E1)-(E1') steps, valves 107, 027, 028 are open and valve 108 is used to control the rate. Bed 9 undergoing the third equalization step down (E3) is sending gas to Bed 3 via the sixth manifold. Valves 096, 036, 038 are in an open position and valve 098 is employed to control the rate of (E3)-(E3') steps. Bed 8 undergoes the fifth equalization step down (E5) by sending gas to Bed 4 via the fifth manifold. Valves 085, 045, 048 are in an open position and valve 088 controls the rate of (E5)-(E5') steps. Bed 7 is providing the purge gas to Bed 5. The rate of the (PPG2) step is controlled by valve 078. Valves 073, 053, 058 are fully open and valve 054 is used to control the pressure in Bed 5. Bed 6 is in blowdown (BD) step in this Step No. 1, and the desorbed impurities exit the bed through control valve 064.

Step No. 2: Five beds are processing feed, namely Bed 1, Bed 11, Bed 12, Bed 13 and Bed 14. It follows that the valves 011, 012, 111, 112, 121, 122, 131, 132, 141 and 142 are in the open position. Bed 2 is in the product pressurization step (PP), (i.e., part of the product gas is recycled back to the process to raise the Bed 2 pressure). Valves 027 and 028 are in the open position while valve 007 controls the rate of this step. Bed 10 and Bed 3 are interacting such that Bed 10 is sending equalization gas to Bed 3 through the sixth manifold. To carry out the (E2)-(E2') steps, valves 106, 036, 038 are in the open position and valve 108 is used to control the rate. Bed 9 undergoes the fourth equalization step down (E4) by sending gas to Bed 4 through the fifth manifold. Valves 095, 045, 048 are open and valve 098 controls the rate of (E4)-(E4') steps. Bed 8 and Bed 7 are providing the purge gas to Bed 5 and Bed 6. The rate of the (PPG1) and (PPG3) steps is controlled by valves 078 and 088, while valves 073, 083, 063, 053, 068, 058 are fully open and valves 054 and 064 are used to control the pressures in Bed 5 and Bed 6, respectively. In this scenario, the (PPG1) and (PPG3) steps share the third manifold and, thus, the sequential refluxing protocol is not followed. However, it will be understood that an additional manifold may be employed in order to comply with sequential refluxing protocol.

In yet another exemplary embodiment it is possible to scale up the plant even further to a sixteen bed PSA system, through the innovative cycle of the present invention, thereby increasing production capacities to around 200 MMSCFD of hydrogen. The novel 16-6-6 PSA cycle has thirty-two steps, features six parallel feeds and six bed-to-bed equalization steps. The cycle's unit block will be defined by duration two steps $t_1+t_2$ for a total cycle time $CT=16*(t_1+t_2)$. By describing all events and interactions for the first two steps the cycle is fully defined. The cycle chart in Table 8 shows the cycle steps. FIG. 3, albeit for a twelve bed process, it is utilized herein for illustration purposes of the sixteen bed system, where four additional beds and one more manifold (which shall be referred herein as the ninth manifold) would be added to the process layout. The valve nomenclature utilized above, would be applicable.

In summary; the sixteen bed process needs 16 beds, 2 manifolds on the feed end, 6 manifolds on the product end of the beds, and nine valves per bed. The cycle chart in Table 8 shows the cycle steps.

TABLE 8

Large Plant 16-6-6 cycle chart
(16 Bed H$_2$ PSA System Operation)

| Bed# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A1 | A2 | A3 | A4 | A5 | A6 | A7 | A8 | A9 | A10 | A11 | A12 | E1 | E2 | E3 | E4 |
| 2 | E1' | PP | A1 | A2 | A3 | A4 | A5 | A6 | A7 | A8 | A9 | A10 | A11 | A12 | E1 | E2 |
| 3 | E3' | E2' | E1' | PP | A1 | A2 | A3 | A4 | A5 | A6 | A7 | A8 | A9 | A10 | A11 | A12 |
| 4 | E5' | E4' | E3' | E2' | E1' | PP | A1 | A2 | A3 | A4 | A5 | A6 | A7 | A8 | A9 | A10 |
| 5 | PG1 | E6' | E5' | E4' | E3' | E2' | E1' | PP | A1 | A2 | A3 | A4 | A5 | A6 | A7 | A8 |
| 6 | PG3 | PG2 | PG1 | E6' | E5' | E4' | E3' | E2' | E1' | PP | A1 | A2 | A3 | A4 | A5 | A6 |
| 7 | PPG3 | BD | PG3 | PG2 | PG1 | E6' | E5' | E4' | E3' | E2' | E1' | PP | A1 | A2 | A3 | A4 |
| 8 | PPG1 | PPG2 | PPG3 | BD | PG3 | PG2 | PG1 | E6' | E5' | E4' | E3' | E2' | E1' | PP | A1 | A2 |
| 9 | E5 | E6 | PPG1 | PPG2 | PPG3 | BD | PG3 | PG2 | PG1 | E6' | E5' | E4' | E3' | E2' | E1' | PP |
| 10 | E3 | E4 | E5 | E6 | PPG1 | PPG2 | PPG3 | BD | PG3 | PG2 | PG1 | E6' | E5' | E4' | E3' | E2' |
| 11 | E1 | E2 | E3 | E4 | E5 | E6 | PPG1 | PPG2 | PPG3 | BD | PG3 | PG2 | PG1 | E6' | E5' | E4' |
| 12 | A11 | A12 | E1 | E2 | E3 | E4 | E5 | E6 | PPG1 | PPG2 | PPG3 | BD | PG3 | PG2 | PG1 | E6' |
| 13 | A9 | A10 | A11 | A12 | E1 | E2 | E3 | E4 | E5 | E6 | PPG1 | PPG2 | PPG3 | BD | PG3 | PG2 |
| 14 | A7 | A8 | A9 | A10 | A11 | A12 | E1 | E2 | E3 | E4 | E5 | E6 | PPG1 | PPG2 | PPG3 | BD |
| 15 | A5 | A6 | A7 | A8 | A9 | A10 | A11 | A12 | E1 | E2 | E3 | E4 | E5 | E6 | PPG1 | PPG2 |
| 16 | A3 | A4 | A5 | A6 | A7 | A8 | A9 | A10 | A11 | A12 | E1 | E2 | E3 | E4 | E5 | E6 |

| Bed# | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| 1 | E5 | E6 | PPG1 | PPG2 | PPG3 | BD | PG3 | PG2 | PG1 | E6' | E5' | E4' | E3' | E2' | E1' | PP |
| 2 | E3 | E4 | E5 | E6 | PPG1 | PPG2 | PPG3 | BD | PG3 | PG2 | PG1 | E6' | E5' | E4' | E3' | E2' |
| 3 | E1 | E2 | E3 | E4 | E5 | E6 | PPG1 | PPG2 | PPG3 | BD | PG3 | PG2 | PG1 | E6' | E5' | E4' |
| 4 | A11 | A12 | E1 | E2 | E3 | E4 | E5 | E6 | PPG1 | PPG2 | PPG3 | BD | PG3 | PG2 | PG1 | E6' |
| 5 | A9 | A10 | A11 | A12 | E1 | E2 | E3 | E4 | E5 | E6 | PPG1 | PPG2 | PPG3 | BD | PG3 | PG2 |
| 6 | A7 | A8 | A9 | A10 | A11 | A12 | E1 | E2 | E3 | E4 | E5 | E6 | PPG1 | PPG2 | PPG3 | BD |
| 7 | A5 | A6 | A7 | A8 | A9 | A10 | A11 | A12 | E1 | E2 | E3 | E4 | E5 | E6 | PPG1 | PPG2 |
| 8 | A3 | A4 | A5 | A6 | A7 | A8 | A9 | A10 | A11 | A12 | E1 | E2 | E3 | E4 | E5 | E6 |
| 9 | A1 | A2 | A3 | A4 | A5 | A6 | A7 | A8 | A9 | A10 | A11 | A12 | E1 | E2 | E3 | E4 |
| 10 | E1' | PP | A1 | A2 | A3 | A4 | A5 | A6 | A7 | A8 | A9 | A10 | A11 | A12 | E1 | E2 |
| 11 | E3' | E2' | E1' | PP | A1 | A2 | A3 | A4 | A5 | A6 | A7 | A8 | A9 | A10 | A11 | A12 |

TABLE 8-continued

Large Plant 16-6-6 cycle chart
(16 Bed H₂ PSA System Operation)

| 12 | E5' | E4' | E3' | E2' | E1' | PP | A1 | A2 | A3 | A4 | A5 | A6 | A7 | A8 | A9 | A10 |
| 13 | PG1 | E6' | E5' | E4' | E3' | E2' | E1' | PP | A1 | A2 | A3 | A4 | A5 | A6 | A7 | A8 |
| 14 | PG3 | PG2 | PG1 | E6' | E5' | E4' | E3' | E2' | E1' | PP | A1 | A2 | A3 | A4 | A5 | A6 |
| 15 | PPG3 | BD | PG3 | PG2 | PG1 | E6' | E5' | E4' | E3' | E2' | E1' | PP | A1 | A2 | A3 | A4 |
| 16 | PPG1 | PPG2 | PPG3 | BD | PG3 | PG2 | PG1 | E6' | E5' | E4' | E3' | E2' | E1' | PP | A1 | A2 |

Step No. 1: Six beds are processing feed (adsorption step), namely Bed 1, Bed 12, Bed 13, Bed 14, Bed 15 and Bed 16. It follows that the valves 011, 012, 121, 122, 131, 132, 141, 142, 151, 152, 161 and 162 are in the open position. Bed 11 and Bed 2 are interacting such that Bed 11 is sending equalization gas to Bed 2 through the seventh manifold. To carry out the (E1)-(E1') steps, valves 117, 027, 028 are in the open position and valve 118 is used to control the rate. Bed 10 undergoes the third equalization step down (E3) by routing sending gas to Bed 3 through the sixth manifold. Valves 106, 036, 038 are open and valve 108 is used to control the rate of (E3)-(E3') steps. Bed 9 undergoes the fifth equalization step down (E5) by routing gas to Bed 4 via the fifth manifold. Valves 095, 045, 048 are in the open position and valve 098 controls the rate of the (E5)-(E5') steps. Bed 8 is providing the purge gas to the Bed 5 through the ninth manifold. The rate of the (PPG1) step is controlled by valve 088. Valves 089, 059, 058 are fully open and valve 054 is used to control the pressure in Bed 5. In the (PPG3) step, Bed 7 is purging Bed 6 via new manifold number three. Valves 073, 063, 068 are open, valve 078 controls the rate of (PPG3) step and valve 064 controls the pressure in Bed 6.

Step No. 2: Six beds are processing feed, namely Bed 1, Bed 12, Bed 13, Bed 14, Bed 15 and Bed 16. It follows that the valves 011, 012, 121, 122, 131, 132, 141, 142, 151, 152, 161 and 162 are in the open position. Bed 2 is in the product pressurization step (PP), (i.e. part of the product gas is recycled back to the process to raise the Bed 2 pressure). Valves 027 and 028 are open while valve 007 controls the rate of this step. Bed 11 and Bed 3 are interacting such that Bed 11 is sending equalization gas to Bed 3 via the sixth manifold. To achieve (E2)-(E2') steps, valves 116, 036, 038 are in the open position and valve 118 is used to control the rate. Bed 10 undergoes the fourth equalization step down (E4) by sending gas to Bed 4 via the fifth manifold. Valves 105, 045, 048 are in the open position, and valve 108 controls the rate of (E4)-(E4') steps. Bed 9 and Bed 5 are interacting such that Bed 9 is sending equalization gas to Bed 5 through the ninth manifold. To carry out the (E6)-(E6') steps, valves 099, 059, 058 are open and valve 098 is used to control the rate. Bed 8 is providing the purge gas to the Bed 6. The rate of the (PPG2) step is controlled by valve 088. Valves 083, 063, 068 are fully open and valve 064 is employed to control the pressure in Bed 6. Bed 5 is in the blowdown "BD" step in this Step No. 2, while the desorbed impurities exit the bed through control valve 054.

The performance for the large PSA systems (i.e., twelve or more beds) operating in the newly designed 12-4-4, 14-5-5 and 16-6-6 cycles was obtained via mathematical modeling. The result for each cycle is summarized in Table 9. The model assumed following feed gas composition for all cycles: 73.87% hydrogen, 0.23% nitrogen, 3.31% carbon monoxide, 16.37% carbon dioxide, 5.94% methane and 0.3% water. The feed gas temperature was 100° F. and feed gas pressure was 360 psig.

TABLE 9

H₂ PSA cycles and corresponding process performance

|  | 12-4-4 | 14-5-5 | 16-6-6 |
|---|---|---|---|
| Cycle Time [min] | 6.6 | 6.30 | 5.6 |
| [t₁, t₂] [sec] | [16, 17] | [13, 14] | [10, 11] |
| High Pressure [Psig] | 360 | 360 | 360 |
| Low Pressure [Psig] | 5.0 | 5.0 | 5.0 |
| Temperature [K] | 310 | 310 | 310 |
| Bed ID [ft] | 12.5 | 12.5 | 12.5 |
| Feed Rate [MMSCFD] | 195 | 240 | 280 |
| H₂ Product Rate [MMSCFD] | 130 | 163 | 190 |
| Total BSF [lbs/TPD H₂] | 3,484 | 3,239 | 3,181 |
| H₂ Purity [%] | 99.999 | 99.999 | 99.999 |
| H₂ Recovery [%] | 90.3 | 92 | 92 |

Note 1:
MMSCFD represents million standard cubic feet per day of gas where assumed standard conditions are 1 atmosphere pressure and temperature 70° F.;
Note 2:
1 Psig is a unit of pressure corresponding to 6894.757 Pascal; 1 lbs is a mass unit corresponding to 0.4535924 kg; K correspond to SI units for temperature of 1 Kelvin; ft represents distance 1 feet equal to 0.3048 meters;
Note 3:
TPD H₂ represents tons (2000 lbs) of hydrogen per day; and
Note 4:
BSF (bed size factor) is the ratio of total mass of adsorbents in all beds and daily production of hydrogen in tons per days (see Note 3)

As shown in Table 9, the recovery for the 12-4-4, 14-5-5 and 16-6-6 PSA cycles is in excess of 90.0%. This is two or more percentage points higher compared to prior art 12-4-4 cycle discussed in Xu et al (U.S. Pat. No. 6,379,431 B1). See Tables 9. This enhanced hydrogen recovery translates into millions of dollars of additional gas produced and sold on a yearly basis.

While the invention has been described in retail with reference to specific embodiment thereof, it will become apparent to one skilled in the art that various changes and modifications can be made, and equivalents employed, without departing from the scope of the appended claims.

What is claimed is:

1. A pressure swing adsorption process for separating a pressurized supply feed gas containing one or more strongly adsorbable component from at least one less strongly adsorbable product gas component in a twelve bed pressure swing adsorption system to produce a continuous stream of product gas enriched in the less strongly adsorbable component and a continuous stream of offgas that is enriched in strongly adsorbable components, wherein the process cycle has four bed-to-bed equalizations steps, four of the beds are in production, and utilizes purge gas of increasing concentrations of the less strongly adsorbable product gas during the purging steps, in accordance to the following cycle chart:

|  | Step: | | | | | | | |
|---|---|---|---|---|---|---|---|---|
| Bed# | 1 | 2 | 3 | 4 | 5 | 6 | 7 | 8 |
| 1 | A1 | A2 | A3 | A4 | A5 | A6 | A7 | A8 |
| 2 | E1' | PP | A1 | A2 | A3 | A4 | A5 | A6 |

-continued

| | | | | Step: | | | | |
|---|---|---|---|---|---|---|---|---|
| | 1 | 2 | 3 | 4 | 5 | 6 | 7 | 8 |
| 3 | E3' | E2' | E1' | PP | A1 | A2 | A3 | A4 |
| 4 | PG1 | E4' | E3' | E2' | E1' | PP | A1 | A2 |
| 5 | PG3 | PG2 | PG1 | E4' | E3' | E2' | E1' | PP |
| 6 | PPG3/BD1 | BD2 | PG3 | PG2 | PG1 | E4' | E3' | E2' |
| 7 | PPG1 | PPG2 | PPG3/BD1 | BD2 | PG3 | PG2 | PG1 | E4' |
| 8 | E3 | E4 | PPG1 | PPG2 | PPG3/BD1 | BD2 | PG3 | PG2 |
| 9 | E1 | E2 | E3 | E4 | PPG1 | PPG2 | PPG3/BD1 | BD2 |
| 10 | A7 | A8 | E1 | E2 | E3 | E4 | PPG1 | PPG2 |
| 11 | A5 | A6 | A7 | A8 | E1 | E2 | E3 | E4 |
| 12 | A3 | A4 | A5 | A6 | A7 | A8 | E1 | E2 |

| | | | | Step: | | | | |
|---|---|---|---|---|---|---|---|---|
| Bed# | 9 | 10 | 11 | 12 | 13 | 14 | 15 | 16 |
| 1 | E1 | E2 | E3 | E4 | PPG1 | PPG2 | PPG3/BD1 | BD2 |
| 2 | A7 | A8 | E1 | E2 | E3 | E4 | PPG1 | PPG2 |
| 3 | A5 | A6 | A7 | A8 | E1 | E2 | E3 | E4 |
| 4 | A3 | A4 | A5 | A6 | A7 | A8 | E1 | E2 |
| 5 | A1 | A2 | A3 | A4 | A5 | A6 | A7 | A8 |
| 6 | E1' | PP | A1 | A2 | A3 | A4 | A5 | A6 |
| 7 | E3' | E2' | E1' | PP | A1 | A2 | A3 | A4 |
| 8 | PG1 | E4' | E3' | E2' | E1' | PP | A1 | A2 |
| 9 | PG3 | PG2 | PG1 | E4' | E3' | E2' | E1' | PP |
| 10 | PPG3/BD1 | BD2 | PG3 | PG2 | PG1 | E4' | E3' | E2' |
| 11 | PPG1 | PPG2 | PPG3/BD1 | BD2 | PG3 | PG2 | PG1 | E4' |
| 12 | E3 | E4 | PPG1 | PPG2 | PPG3/BD1 | BD2 | PG3 | PG2 |

| | | | | Step: | | | | |
|---|---|---|---|---|---|---|---|---|
| Bed# | 17 | 18 | 19 | 20 | 21 | 22 | 23 | 24 |
| 1 | PG3 | PG2 | PG1 | E4' | E3' | E2' | E1' | PP |
| 2 | PPG3/BD1 | BD2 | PG3 | PG2 | PG1 | E4' | E3' | E2' |
| 3 | PPG1 | PPG2 | PPG3/BD1 | BD2 | PG3 | PG2 | PG1 | E4' |
| 4 | E3 | E4 | PPG1 | PPG2 | PPG3/BD1 | BD2 | PG3 | PG2 |
| 5 | E1 | E2 | E3 | E4 | PPG1 | PPG2 | PPG3/BD1 | BD2 |
| 6 | A7 | A8 | E1 | E2 | E3 | E4 | PPG1 | PPG2 |
| 7 | A5 | A6 | A7 | A8 | E1 | E2 | E3 | E4 |
| 8 | A3 | A4 | A5 | A6 | A7 | A8 | E1 | E2 |
| 9 | A1 | A2 | A3 | A4 | A5 | A6 | A7 | A8 |
| 10 | E1' | PP | A1 | A2 | A3 | A4 | A5 | A6 |
| 11 | E3' | E2' | E1' | PP | A1 | A2 | A3 | A4 |
| 12 | PG1 | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
A7=Seventh Adsorption Step
A8=Eighth Adsorption Step
E1=First Equalization Down
E2=Second Equalization Down
E3=Third Equalization Down
E4=Fourth Equalization Down
PPG1=First Provide Purge Gas
PPG2=Second Provide Purge Gas
PPG3/BD1=Third Provide Purge Gas/First Blowdown
BD2=Second Blowdown
PG3=Purge using gas from PPG3 step
PG2=Purge using gas from PPG2 step
PG1=Purge using gas from PPG1 step
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

2. The pressure swing adsorption process of claim 1, wherein said less strongly adsorbable product gas is hydrogen.

3. The pressure swing adsorption process of claim 1, wherein the supply feed gas containing one or more strongly adsorbable component is selected from the group consisting of hydrocarbons, carbon dioxide, carbon monoxide, argon, nitrogen, helium and water vapor.

4. The pressure swing adsorption process of claim 1, wherein each adsorbent bed contains alumina, carbon and zeolite material configured in layers disposed in this particular order for feed gas processing.

5. The pressure swing adsorption process of claim 4, where the carbon and zeolite layers are each subdivided into two layers with different particle size.

6. The pressure swing adsorption process of claim 5, where the first of the subdivided carbon layers encountered by the supply feed gas has a particle size of about 0.5 to 1.5 mm and an affinity for the carbon dioxide impurity.

7. The pressure swing adsorption process of claim 5, where the second of the subdivided carbon layers encountered by the supply feed gas has a particle size of about 2.0 to 3.0 mm and an affinity for the methane impurities.

8. The pressure swing adsorption process of claim 5, where the first of the subdivided zeolite layers encountered by the supply feed gas has a particle size of about 0.5 to 2.0 mm and an affinity for the carbon monoxide impurity.

9. The pressure swing adsorption process of claim 5, where the second of the subdivided zeolite layers encountered by the supply feed gas has a particle size of about 2.0 to 3.0 mm and an affinity for the nitrogen impurity.

10. A pressure swing adsorption process for separating a pressurized supply feed gas containing one or more strongly adsorbable component from at least one less strongly adsorbable product gas component in a eleven bed pressure swing adsorption system to produce a continuous stream of product gas enriched in the less strongly adsorbable component and a continuous stream of offgas that is enriched in strongly adsorbable components, wherein the process cycle has four bed-to-bed equalizations steps, while four of the beds are in production, and utilize purge gas of increasing concentrations of the less strongly adsorbable product gas during the purging steps.

11. The pressure swing adsorption process of claim 10, wherein the PSA cycle comprises at-least twenty two steps.

12. The pressure swing adsorption process of claim 10, in accordance to the following cycle chart:

| Bed# | Step: 1 | 2 | 3 | 4 | 5 | 6 | 7 | 8 | 9 | 10 | 11 |
|---|---|---|---|---|---|---|---|---|---|---|---|
| 1 | A1 | A2 | A3 | A4 | A5 | A6 | A7 | A8 | E1 | E2 | E3 |
| 2 | E1' | PP | A1 | A2 | A3 | A4 | A5 | A6 | A7 | A8 | E1 |
| 3 | E3' | E2' | E1' | PP | A1 | A2 | A3 | A4 | A5 | A6 | A7 |
| 4 | PG1 | E4' | E3' | E2' | E1' | PP | A1 | A2 | A3 | A4 | A5 |
| 5 | BD | PG2 | PG1 | E4' | E3' | E2' | E1' | PP | A1 | A2 | A3 |
| 6 | PPG1 | PPG2 | BD | PG2 | PG1 | E4' | E3' | E2' | E1' | PP | A1 |
| 7 | E3 | E4 | PPG1 | PPG2 | BD | PG2 | PG1 | E4' | E3' | E2' | E1' |
| 8 | E1 | E2 | E3 | E4 | PPG1 | PPG2 | BD | PG2 | PG1 | E4' | E3' |
| 9 | A7 | A8 | E1 | E2 | E3 | E4 | PPG1 | PPG2 | BD | PG2 | PG1 |
| 10 | A5 | A6 | A7 | A8 | E1 | E2 | E3 | E4 | PPG1 | PPG2 | BD |
| 11 | A3 | A4 | A5 | A6 | A7 | A8 | E1 | E2 | E3 | E4 | PPG1 |

| Bed# | Step: 12 | 13 | 14 | 15 | 16 | 17 | 18 | 19 | 20 | 21 | 22 |
|---|---|---|---|---|---|---|---|---|---|---|---|
| 1 | E4 | PPG1 | PPG2 | BD | PG2 | PG1 | E4' | E3' | E2' | E1' | PP |
| 2 | E2 | E3 | E4 | PPG1 | PPG2 | BD | PG2 | PG1 | E4' | E3' | E2' |
| 3 | A8 | E1 | E2 | E3 | E4 | PPG1 | PPG2 | BD | PG2 | PG1 | E4' |
| 4 | A6 | A7 | A8 | E1 | E2 | E3 | E4 | PPG1 | PPG2 | BD | PG2 |
| 5 | A4 | A5 | A6 | A7 | A8 | E1 | E2 | E3 | E4 | PPG1 | PPG2 |
| 6 | A2 | A3 | A4 | A5 | A6 | A7 | A8 | E1 | E2 | E3 | E4 |
| 7 | PP | A1 | A2 | A3 | A4 | A5 | A6 | A7 | A8 | E1 | E2 |
| 8 | E2' | E1' | PP | A1 | A2 | A3 | A4 | A5 | A6 | A7 | A8 |
| 9 | E4' | E3' | E2' | E1' | PP | A1 | A2 | A3 | A4 | A5 | A6 |
| 10 | PG2 | PG1 | E4' | E3' | E2' | E1' | PP | A1 | A2 | A3 | A4 |
| 11 | PPG2 | BD | PG2 | PG1 | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
A7=Seventh Adsorption Step
A8=Eighth Adsorption Step
E1=First Equalization Down
E2=Second Equalization Down
E3=Third Equalization Down
E4=Fourth Equalization Down
PPG1=First Provide Purge Gas
PPG2=Second Provide Purge Gas
BD=Blowdown
PG2=Purge using gas from PPG2 step
PG1=Purge using gas from PPG1 step
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

13. A pressure swing adsorption process for separating a pressurized supply feed gas containing one or more strongly adsorbable component from at least one less strongly adsorbable product gas component in a twelve bed pressure swing adsorption system to produce a continuous stream of product gas enriched in the less strongly adsorbable component and a continuous stream of offgas that is enriched in strongly adsorbable components, wherein the process cycle has five bed-to-bed equalizations steps, three of the beds are in production, and utilize purge gas of increasing concentrations of the less strongly adsorbable product gas during the purging steps, in accordance to the following cycle chart:

| Bed# | Step: 1 | 2 | 3 | 4 | 5 | 6 | 7 | 8 | 9 | 10 | 11 | 12 |
|---|---|---|---|---|---|---|---|---|---|---|---|---|
| 1 | A1 | A2 | A3 | A4 | A5 | A6 | E1 | E2 | E3 | E4 | E5 | PPG1 |
| 2 | E1' | PP | A1 | A2 | A3 | A4 | A5 | A6 | E1 | E2 | E3 | E4 |
| 3 | E3' | E2' | E1' | PP | A1 | A2 | A3 | A4 | A5 | A6 | E1 | E2 |
| 4 | E5' | E4' | E3' | E2' | E1' | PP | A1 | A2 | A3 | A4 | A5 | A6 |
| 5 | PG2 | PG1 | E5' | E4' | E3' | E2' | E1' | PP | A1 | A2 | A3 | A4 |
| 6 | BD | PG3 | PG2 | PG1 | E5' | E4' | E2' | E2' | E1' | PP | A1 | A2 |
| 7 | PPG2 | PPG1 | BD | PG3 | PG2 | PG1 | E5' | E4' | E3' | E2' | E1' | PP |
| 8 | E5 | PPG1 | PPG2 | PPG3 | BD | PG3 | PG2 | PG1 | E5' | E4' | E3' | E2' |
| 9 | E3 | E4 | E5 | PPG1 | PPG2 | PPG3 | BD | PG3 | PG2 | PG1 | E5' | E4' |
| 10 | E1 | E2 | E3 | E4 | E5 | PPG1 | PPG2 | PPG3 | BD | PG3 | PG2 | PG1 |
| 11 | A5 | A6 | E1 | E2 | E3 | E4 | E5 | PPG1 | PPG2 | PPG3 | BD | PG3 |
| 12 | A3 | A4 | A5 | A6 | E1 | E2 | E3 | E4 | E5 | PPG1 | PPG2 | PPG3 |

-continued

| Bed# | 13 | 14 | 15 | 16 | 17 | 18 | 19 | 20 | 21 | 22 | 23 | 24 |
|---|---|---|---|---|---|---|---|---|---|---|---|---|
| 1 | PPG2 | PPG3 | BD | PG3 | PG2 | PG1 | E5' | E4' | E3' | E2' | E1' | PP |
| 2 | E5 | PPG1 | PPG2 | PPG3 | BD | PG3 | PG2 | PG1 | E5' | E4' | E3' | E2' |
| 3 | E3 | E4 | E5 | PPG1 | PPG2 | PPG3 | BD | PG3 | PG2 | PG1 | E5' | E4' |
| 4 | E1 | E2 | E3 | E4 | E5 | PPG1 | PPG2 | PPG3 | BD | PG3 | PG2 | PG1 |
| 5 | A5 | A6 | E1 | E2 | E3 | E4 | E5 | PPG1 | PPG2 | PPG3 | BD | PG3 |
| 6 | A3 | A4 | A5 | A6 | E1 | E2 | E3 | E4 | E5 | PPG1 | PPG2 | PPG3 |
| 7 | A1 | A2 | A3 | A4 | A5 | A6 | E1 | E2 | E3 | E4 | E5 | PPG1 |
| 8 | E1' | PP | A1 | A2 | A3 | A4 | A5 | A6 | E1 | E2 | E3 | E4 |
| 9 | E3' | E2' | E1' | PP | A1 | A2 | A3 | A4 | A5 | A6 | E1 | E2 |
| 10 | E5' | E4' | E3' | E2' | E1' | PP | A1 | A2 | A3 | A4 | A5 | A6 |
| 11 | PG2 | PG1 | E5' | E4' | E3' | E2' | E1' | PP | A1 | A2 | A3 | A4 |
| 12 | BD | PG3 | PG2 | PG1 | E5' | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
E1=First Equalization Down
E2=Second Equalization Down
E3=Third Equalization Down
E4=Fourth Equalization Down
PPG1=First Provide Purge Gas
PPG2=Second Provide Purge Gas
PPG3=Third Provide Purge Gas/First Blowdown
BD=Second Blowdown
PG3=Purge using gas from PPG3 step
PG2=Purge using gas from PPG2 step
PG1=Purge using gas from PPG1 step
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

14. A pressure swing adsorption process for separating a pressurized supply feed gas containing one or more strongly adsorbable component from at least one less strongly adsorbable product gas component in a fourteen bed pressure swing adsorption system to produce a continuous stream of product gas enriched in the less strongly adsorbable component and a continuous stream of offgas that is enriched in strongly adsorbable components, wherein the process cycle has five bed-to-bed equalizations steps, five of the beds are in production, and utilize purge gas of increasing concentrations of the less strongly adsorbable product gas during the purging steps.

15. The pressure swing adsorption process of claim 14, wherein the PSA cycle comprises at-least twenty eight steps.

16. The pressure swing adsorption process of claim 14, in accordance to the following cycle chart:

| Bed# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | A1 | A2 | A3 | A4 | A5 | A6 | A7 | A8 | A9 | A10 | E1 | E2 | E3 | E4 |
| 2 | E1' | PP | A1 | A2 | A3 | A4 | A5 | A6 | A7 | A8 | A9 | A10 | E1 | E2 |
| 3 | E3' | E2' | E1' | PP | A1 | A2 | A3 | A4 | A5 | A6 | A7 | A8 | A9 | A10 |
| 4 | E5' | E4' | E3' | E2' | E1' | PP | A1 | A2 | A3 | A4 | A5 | A6 | A7 | A8 |
| 5 | PG2 | PG1 | E5' | E4' | E3' | E2' | E1' | PP | A1 | A2 | A3 | A4 | A5 | A6 |
| 6 | BD | PG3 | PG2 | PG1 | E5' | E4' | E3' | E2' | E1' | PP | A1 | A2 | A3 | A4 |
| 7 | PPG2 | PPG3 | BD | PG3 | PG2 | PG1 | E5' | E4' | E3' | E2' | E1' | PP | A1 | A2 |
| 8 | E5 | PPG1 | PPG2 | PPG3 | BD | PG3 | PG2 | PG1 | E5' | E4' | E3' | E2' | E1' | PP |
| 9 | E3 | E4 | E5 | PPG1 | PPG2 | PPG3 | BD | PG3 | PG2 | PG1 | E5' | E4' | E3' | E2' |
| 10 | E1 | E2 | E3 | E4 | E5 | PPG1 | PPG2 | PPG3 | BD | PG3 | PG2 | PG1 | E5' | E4' |
| 11 | A9 | A10 | E1 | E2 | E3 | E4 | E5 | PPG1 | PPG2 | PPG3 | BD | PG3 | PG2 | PG1 |
| 12 | A7 | A8 | A9 | A10 | E1 | E2 | E3 | E4 | E5 | PPG1 | PPG2 | PPG3 | BD | PG3 |
| 13 | A5 | A6 | A7 | A8 | A9 | A10 | E1 | E2 | E3 | E4 | E5 | PPG1 | PPG2 | PPG3 |
| 14 | A3 | A4 | A5 | A6 | A7 | A8 | A9 | A10 | E1 | E2 | E3 | E4 | E5 | PPG1 |

| Bed# | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| 1 | E5 | PPG1 | PPG2 | PPG3 | BD | PG3 | PG2 | PG1 | E5' | E4' | E3' | E2' | E1' | PP |
| 2 | E3 | E4 | E5 | PPG1 | PPG2 | PPG3 | BD | PG3 | PG2 | PG1 | E5' | E4' | E3' | E2' |
| 3 | E1 | E2 | E3 | E4 | E5 | PPG1 | PPG2 | PPG3 | BD | PG3 | PG2 | PG1 | E5' | E4' |
| 4 | A9 | A10 | E1 | E2 | E3 | E4 | E5 | PPG1 | PPG2 | PPG3 | BD | PG3 | PG2 | PG1 |
| 5 | A7 | A8 | A9 | A10 | E1 | E2 | E3 | E4 | E5 | PPG1 | PPG2 | PPG 3 | BD | PG3 |
| 6 | A5 | A6 | A7 | A8 | A9 | A10 | E1 | E2 | E3 | E4 | E5 | PPG1 | PPG2 | PPG3 |
| 7 | A3 | A4 | A5 | A6 | A7 | A8 | A9 | A10 | E1 | E2 | E3 | E4 | E5 | PPG1 |
| 8 | A1 | A2 | A3 | A4 | A5 | A6 | A7 | A8 | A9 | A10 | E1 | E2 | E3 | E4 |
| 9 | E1' | PP | A1 | A2 | A3 | A4 | A5 | A6 | A7 | A8 | A9 | A10 | E1 | E2 |
| 10 | E3' | E2' | E1' | PP | A1 | A2 | A3 | A4 | A5 | A6 | A7 | A8 | A9 | A10 |

-continued

| | | | | | | | | | | | | |
|---|---|---|---|---|---|---|---|---|---|---|---|---|
| 11 | E5' | E4' | E3' | E2' | E1' | PP | A1 | A2 | A3 | A4 | A5 | A6 | A7 | A8 |
| 12 | PG2 | PG1 | E5' | E4' | E3' | E2' | E1' | PP | A1 | A2 | A3 | A4 | A5 | A6 |
| 13 | BD | PG3 | PG2 | PG1 | E5' | E4 | E3' | E2' | E1' | PP | A1 | A2 | A3 | A4 |
| 14 | PPG2 | PPG3 | BD | PG3 | PG2 | PG1 | E5' | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
A7=Seventh Adsorption Step
A8=Eighth Adsorption Step
A9=Ninth Adsorption Step
A10=Tenth Adsorption Step
E1=First Equalization Down
E2=Second Equalization Down
E3=Third Equalization Down
E4=Fourth Equalization Down
E5=Fifth Equalization Down
PPG1=First Provide Purge Gas
PPG2=Second Provide Purge Gas
PPG3=Third Provide Purge Gas
BD=Blowdown
PG3=Purge using gas from PPG3 step
PG2=Purge using gas from PPG2 step
PG1=Purge using gas from PPG1 step
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

17. A pressure swing adsorption process for separating a pressurized supply feed gas containing one or more strongly adsorbable component from at least one less strongly adsorbable product gas component in a sixteen bed pressure swing adsorption system to produce a continuous stream of product gas enriched in the less strongly adsorbable component and a continuous stream of offgas that is enriched in strongly adsorbable components, wherein the process cycle has six bed-to-bed equalizations steps, six of the beds are in production, and utilize purge gas of increasing concentrations of the less strongly adsorbable product gas during the purging steps.

18. The pressure swing adsorption process of claim 17, wherein the PSA cycle comprises at-least thirty two steps.

19. The pressure swing adsorption process of claim 17, in accordance to the following cycle chart:

| | Step: | | | | | | | | | | | | | | | |
|---|---|---|---|---|---|---|---|---|---|---|---|---|---|---|---|---|
| Bed# | 1 | 2 | 3 | 4 | 5 | 6 | 7 | 8 | 9 | 10 | 11 | 12 | 13 | 14 | 15 | 16 |
| 1 | A1 | A2 | A3 | A4 | A5 | A6 | A7 | A8 | A9 | A10 | A11 | A12 | E1 | E2 | E3 | E4 |
| 2 | E1' | PP | A1 | A2 | A3 | A4 | A5 | A6 | A7 | A8 | A9 | A10 | A11 | A12 | E1 | E2 |
| 3 | E3' | E2' | E1' | PP | A1 | A2 | A3 | A4 | A5 | A6 | A7 | A8 | A9 | A10 | A11 | A12 |
| 4 | E5' | E4' | E3' | E2' | E1' | PP | A1 | A2 | A3 | A4 | A5 | A6 | A7 | A8 | A9 | A10 |
| 5 | PG1 | E6' | E5' | E4' | E3' | E2' | E1' | PP | A1 | A2 | A3 | A4 | A5 | A6 | A7 | A8 |
| 6 | PG3 | PG2 | PG1 | E6' | E5' | E4' | E3' | E2' | E1' | PP | A1 | A2 | A3 | A4 | A5 | A6 |
| 7 | PPG3 | BD | PG3 | PG2 | PG1 | E6' | E5' | E4' | E3' | E2' | E1' | PP | A1 | A2 | A3 | A4 |
| 8 | PPG1 | PPG2 | PPG3 | BD | PG3 | PG2 | PG1 | E6' | E5' | E4' | E3' | E2' | E1' | PP | A1 | A2 |
| 9 | E5 | E6 | PPG1 | PPG2 | PPG3 | BD | PG3 | PG2 | PG1 | E6' | E5' | E4' | E3' | E2' | E1' | PP |
| 10 | E3 | E4 | E5 | E6 | PPG1 | PPG2 | PPG3 | BD | PG3 | PG2 | PG1 | E6' | E5' | E4' | E3' | E2' |
| 11 | E1 | E2 | E3 | E4 | E5 | E6 | PPG1 | PPG2 | PPG3 | BD | PG3 | PG2 | PG1 | E6' | E5' | E4' |
| 12 | A11 | A12 | E1 | E2 | E3 | E4 | E5 | E6 | PPG1 | PPG2 | PPG3 | BD | PG3 | PG2 | PG1 | E6' |
| 13 | A9 | A10 | A11 | A12 | E1 | E2 | E3 | E4 | E5 | E6 | PPG1 | PPG2 | PPG3 | BD | PG3 | PG2 |
| 14 | A7 | A8 | A9 | A10 | A11 | A12 | E1 | E2 | E3 | E4 | E5 | E6 | PPG1 | PPG2 | PPG3 | BD |
| 15 | A5 | A6 | A7 | A8 | A9 | A10 | A11 | A12 | E1 | E2 | E3 | E4 | E5 | E6 | PPG1 | PPG2 |
| 16 | A3 | A4 | A5 | A6 | A7 | A8 | A9 | A10 | A11 | A12 | E1 | E2 | E3 | E4 | E5 | E6 |

| | Step: | | | | | | | | | | | | | | | |
|---|---|---|---|---|---|---|---|---|---|---|---|---|---|---|---|---|
| Bed# | 17 | 18 | 19 | 20 | 21 | 22 | 23 | 24 | 25 | 26 | 27 | 28 | 29 | 30 | 31 | 32 |
| 1 | E5 | E6 | PPG1 | PPG2 | PPG3 | BD | PG3 | PG2 | PG1 | E6' | E5' | E4' | E3' | E2' | E1' | PP |
| 2 | E3 | E4 | E5 | E6 | PPG1 | PPG2 | PPG3 | BD | PG3 | PG2 | PG1 | E6' | E5' | E4' | E3' | E2' |
| 3 | E1 | E2 | E3 | E4 | E5 | E6 | PPG1 | PPG2 | PPG3 | BD | PG3 | PG2 | PG1 | E6' | E5' | E4' |
| 4 | A11 | A12 | E1 | E2 | E3 | E4 | E5 | E6 | PPG1 | PPG2 | PPG3 | BD | PG3 | PG2 | PG1 | E6' |
| 5 | A9 | A10 | A11 | A12 | E1 | E2 | E3 | E4 | E5 | E6 | PPG1 | PPG2 | PPG3 | BD | PG3 | PG2 |
| 6 | A7 | A8 | A9 | A10 | A11 | A12 | E1 | E2 | E3 | E4 | E5 | E6 | PPG1 | PPG2 | PPG3 | BD |
| 7 | A5 | A6 | A7 | A8 | A9 | A10 | A11 | A12 | E1 | E2 | E3 | E4 | E5 | E6 | PPG1 | PPG2 |
| 8 | A3 | A4 | A5 | A6 | A7 | A8 | A9 | A10 | A11 | A12 | E1 | E2 | E3 | E4 | E5 | E6 |
| 9 | A1 | A2 | A3 | A4 | A5 | A6 | A7 | A8 | A9 | A10 | A11 | A12 | E1 | E2 | E3 | E4 |
| 10 | E1' | PP | A1 | A2 | A3 | A4 | A5 | A6 | A7 | A8 | A9 | A10 | A11 | A12 | E1 | E2 |
| 11 | E3' | E2' | E1' | PP | A1 | A2 | A3 | A4 | A5 | A6 | A7 | A8 | A9 | A10 | A11 | A12 |
| 12 | E5' | E4' | E3' | E2' | E1' | PP | A1 | A2 | A3 | A4 | A5 | A6 | A7 | A8 | A9 | A10 |
| 13 | PG1 | E6' | E5' | E4' | E3' | E2' | E1' | PP | A1 | A2 | A3 | A4 | A5 | A6 | A7 | A8 |
| 14 | PG3 | PG2 | PG1 | E6' | E5' | E4' | E3' | E2' | E1' | PP | A1 | A2 | A3 | A4 | A5 | A6 |
| 15 | PPG3 | BD | PG3 | PG2 | PG1 | E6' | E5' | E4' | E3' | E2' | E1' | PP | A1 | A2 | A3 | A4 |
| 16 | PPG1 | PPG2 | PPG3 | BD | PG3 | PG2 | PG1 | E6' | E5' | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
A7=Seventh Adsorption Step
A8=Eighth Adsorption Step
A9-A12=Ninth to Twelfth Adsorption Steps
E1=First Equalization Down
E2=Second Equalization Down
E3=Third Equalization Down
E4=Fourth Equalization Down
E5=Fifth Equalization Down
E6=Sixth Equalization Down
PPG1=First Provide Purge Gas
PPG2=Second Provide Purge Gas
PPG3=Third Provide Purge Gas
BD=Blowdown
PG3=Purge using gas from PPG3 step
PG2=Purge using gas from PPG2 step
PG1=Purge using gas from PPG1 step
E6'=Equalization Up (using gas from E6 step)
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

* * * * *